US012646147B2

(12) United States Patent
Kang et al.

(10) Patent No.: US 12,646,147 B2
(45) Date of Patent: Jun. 2, 2026

(54) METHODS OF PROCESSING IMAGES USING FUTURE FRAMES AND IMAGE PROCESSING DEVICES PERFORMING THE SAME

(71) Applicant: Samsung Electronics Co., Ltd., Suwon-si (KR)

(72) Inventors: Jinwoo Kang, Suwon-si (KR); Dongbum Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 164 days.

(21) Appl. No.: 18/538,127

(22) Filed: Dec. 13, 2023

(65) Prior Publication Data

US 2024/0257314 A1 Aug. 1, 2024

(30) Foreign Application Priority Data

Jan. 30, 2023 (KR) ........................ 10-2023-0011732

(51) Int. Cl.
| | |
|---|---|
| *H04N 5/911* | (2006.01) |
| *G06T 5/50* | (2006.01) |
| *G06T 5/70* | (2024.01) |
| *G06T 7/20* | (2017.01) |
| *H04N 19/172* | (2014.01) |
| *H04N 19/573* | (2014.01) |

(52) U.S. Cl.
CPC .................. *G06T 5/50* (2013.01); *G06T 5/70* (2024.01); *G06T 7/20* (2013.01); *G06T 2207/20221* (2013.01)

(58) Field of Classification Search
CPC .... G06T 5/50; G06T 5/70; G06T 7/20; G06T 2207/20221; H04N 5/911; H04N 19/172; H04N 19/573; H04N 7/014
USPC ........................................................ 345/629
See application file for complete search history.

(56) References Cited

U.S. PATENT DOCUMENTS

| | | |
|---|---|---|
| 7,573,530 B2 | 8/2009 | Zhong |
| 8,023,761 B2 | 9/2011 | Rhee |
| 8,212,933 B2 | 7/2012 | Zhong |
| 8,503,812 B2 | 8/2013 | MacInnis et al. |
| 8,514,332 B2 | 8/2013 | Bai et al. |
| 8,593,483 B2 | 11/2013 | Cote et al. |
| 9,449,371 B1 | 9/2016 | Sheng et al. |
| 9,491,473 B2 | 11/2016 | Bao et al. |
| 9,959,597 B1 | 5/2018 | Liu et al. |
| 10,007,967 B2 * | 6/2018 | Douady-Pleven ... H04N 25/626 |

(Continued)

*Primary Examiner* — Benny Q Tieu
(74) *Attorney, Agent, or Firm* — Harness, Dickey & Pierce, P.L.C.

(57) ABSTRACT

In a method of processing an image, a first composite frame image corresponding to an n-th input frame image is generated by performing a first temporal noise reduction operation based on the n-th input frame image and an (n−m)-th input frame image. The (n−m)-th input frame image is received prior to the n-th input frame image. A second composite frame image corresponding to the n-th input frame image is generated by performing a second temporal noise reduction operation based on the n-th input frame image and an (n+k)-th input frame image. The (n+k)-th input frame image is received subsequent to the n-th input frame image. The second composite frame image is provided as an n-th output frame image corresponding to the n-th input frame image.

20 Claims, 20 Drawing Sheets

(56) References Cited

U.S. PATENT DOCUMENTS

| | | | |
|---|---|---|---|
| 11,182,887 B2 | 11/2021 | Kang et al. | |
| 2002/0028025 A1* | 3/2002 | Hong | G06T 5/20 |
| | | | 382/266 |
| 2015/0178585 A1* | 6/2015 | Karafin | G06T 5/90 |
| | | | 382/197 |
| 2019/0368941 A1* | 12/2019 | Aziz | G01J 5/24 |
| 2022/0044372 A1 | 2/2022 | Smirnov et al. | |
| 2022/0408017 A1* | 12/2022 | Chen | H04N 23/73 |
| 2023/0316463 A1* | 10/2023 | Nishimura | G06T 5/70 |
| | | | 382/260 |
| 2023/0319218 A1* | 10/2023 | Ren | G06T 3/4038 |
| | | | 382/284 |
| 2025/0384523 A1* | 12/2025 | Liu | G06T 5/50 |

* cited by examiner

FIG. 3

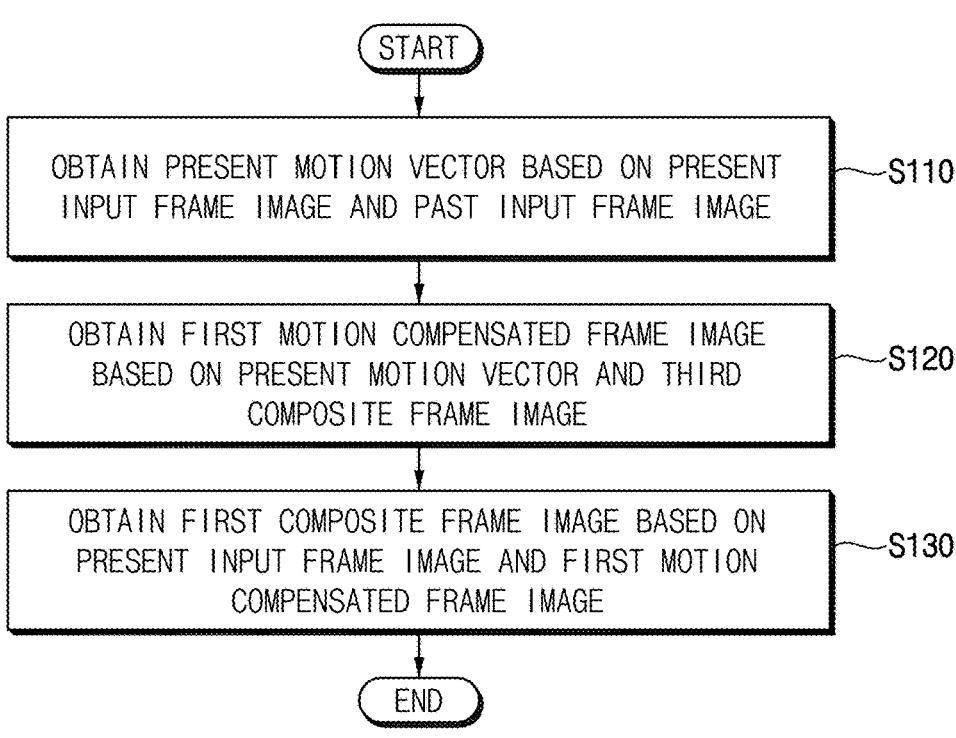

START

OBTAIN PRESENT MOTION VECTOR BASED ON PRESENT INPUT FRAME IMAGE AND PAST INPUT FRAME IMAGE — S110

OBTAIN FIRST MOTION COMPENSATED FRAME IMAGE BASED ON PRESENT MOTION VECTOR AND THIRD COMPOSITE FRAME IMAGE — S120

OBTAIN FIRST COMPOSITE FRAME IMAGE BASED ON PRESENT INPUT FRAME IMAGE AND FIRST MOTION COMPENSATED FRAME IMAGE — S130

END

FIG. 4

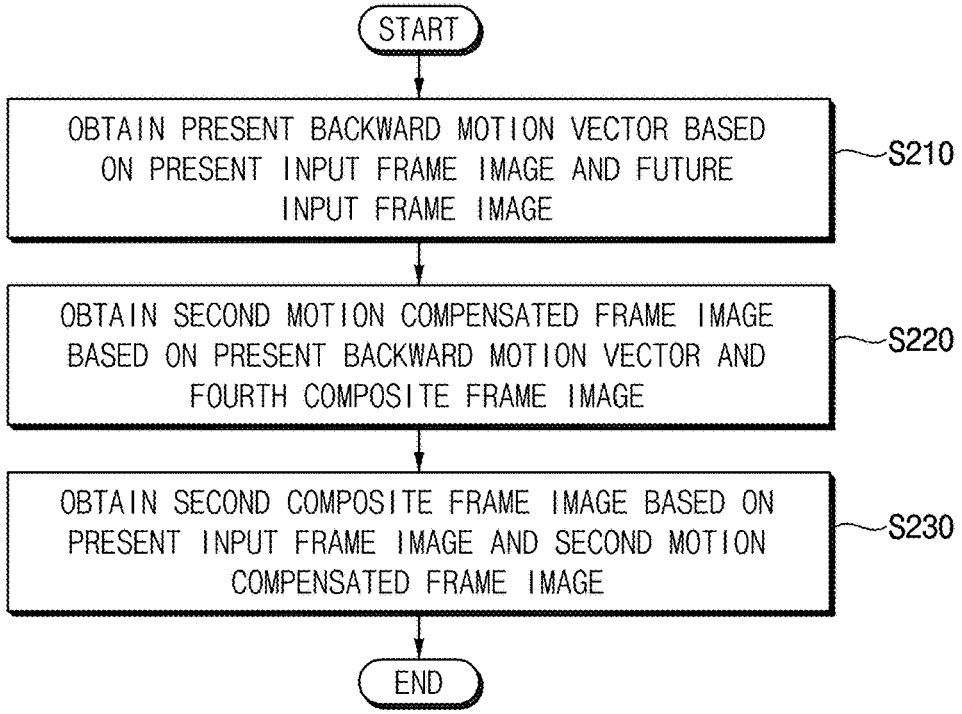

START

OBTAIN PRESENT BACKWARD MOTION VECTOR BASED ON PRESENT INPUT FRAME IMAGE AND FUTURE INPUT FRAME IMAGE — S210

OBTAIN SECOND MOTION COMPENSATED FRAME IMAGE BASED ON PRESENT BACKWARD MOTION VECTOR AND FOURTH COMPOSITE FRAME IMAGE — S220

OBTAIN SECOND COMPOSITE FRAME IMAGE BASED ON PRESENT INPUT FRAME IMAGE AND SECOND MOTION COMPENSATED FRAME IMAGE — S230

END

FIG. 5

FIG. 7A
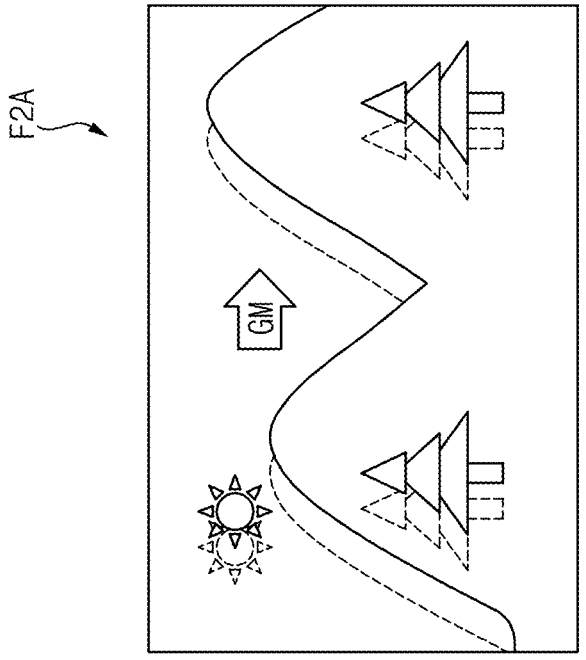
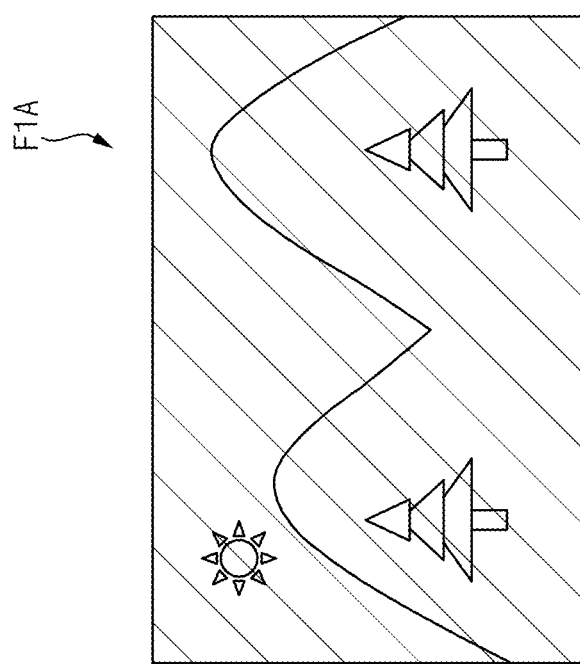

FIG. 9A
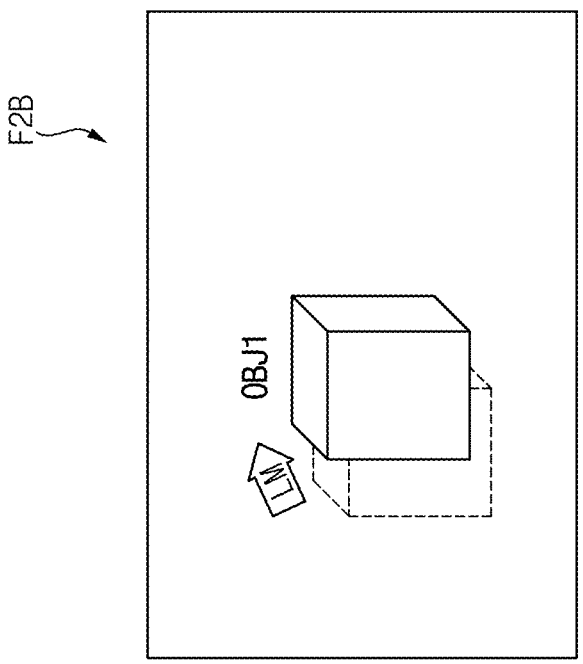
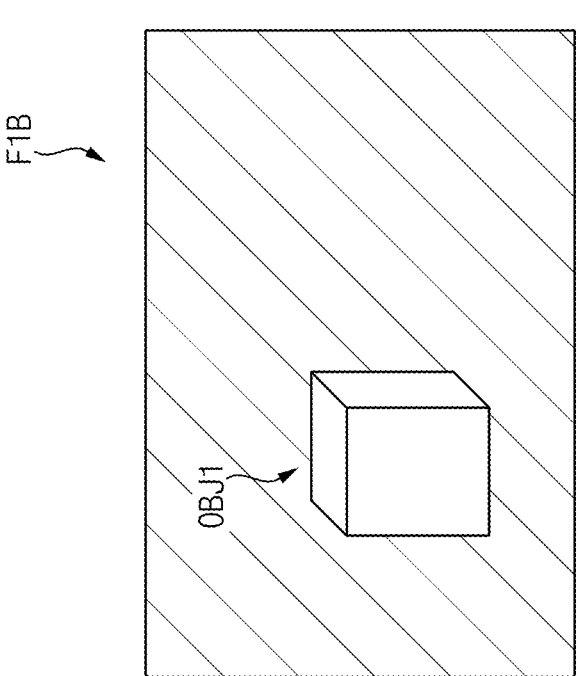

FIG. 12

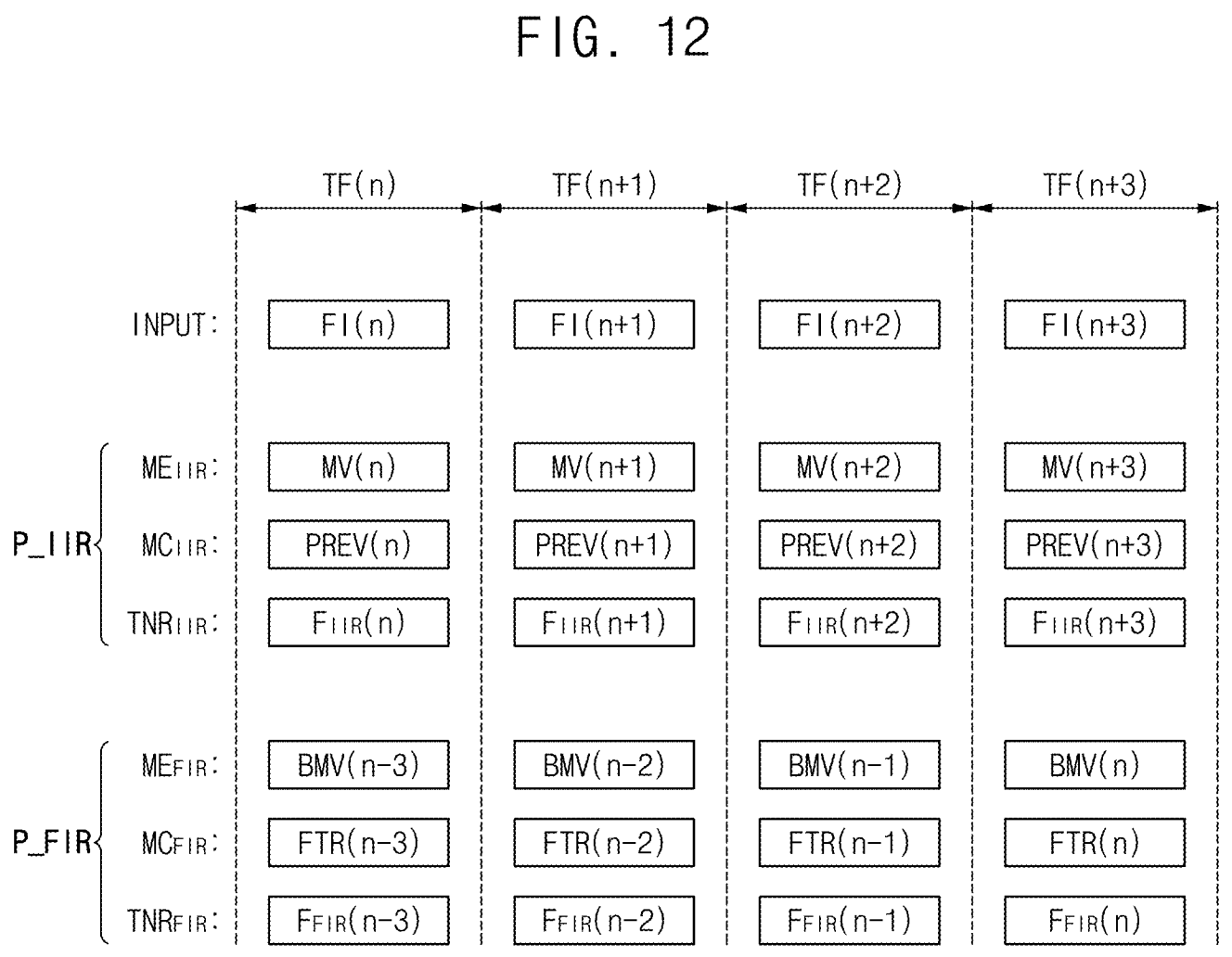

|  | TF(n) | TF(n+1) | TF(n+2) | TF(n+3) |
|---|---|---|---|---|
| INPUT: | FI(n) | FI(n+1) | FI(n+2) | FI(n+3) |
| ME$_{IIR}$: | MV(n) | MV(n+1) | MV(n+2) | MV(n+3) |
| MC$_{IIR}$: | PREV(n) | PREV(n+1) | PREV(n+2) | PREV(n+3) |
| TNR$_{IIR}$: | F$_{IIR}$(n) | F$_{IIR}$(n+1) | F$_{IIR}$(n+2) | F$_{IIR}$(n+3) |
| ME$_{FIR}$: | BMV(n−3) | BMV(n−2) | BMV(n−1) | BMV(n) |
| MC$_{FIR}$: | FTR(n−3) | FTR(n−2) | FTR(n−1) | FTR(n) |
| TNR$_{FIR}$: | F$_{FIR}$(n−3) | F$_{FIR}$(n−2) | F$_{FIR}$(n−1) | F$_{FIR}$(n) |

P_IIR — ME$_{IIR}$, MC$_{IIR}$, TNR$_{IIR}$

P_FIR — ME$_{FIR}$, MC$_{FIR}$, TNR$_{FIR}$

FIG. 16B

METHODS OF PROCESSING IMAGES USING FUTURE FRAMES AND IMAGE PROCESSING DEVICES PERFORMING THE SAME

CROSS-REFERENCE TO RELATED APPLICATION

This application claims priority under 35 USC § 119 to Korean Patent Application No. 10-2023-0011732 filed on Jan. 30, 2023 in the Korean Intellectual Property Office, the contents of which are incorporated herein by reference in their entirety.

BACKGROUND

1. Technical Field

Example embodiments relate generally to semiconductor integrated circuits, and more particularly to methods of processing images using future frames, and/or image processing devices performing the methods.

2. Description of the Related Art

In video system applications, random noise present in analog video signals may result in images that are less than visually pleasing to the viewer. To address this problem, noise reduction (NR) operations may be utilized to remove or mitigate the analog noise present. Traditional NR operations may use either infinite impulse response (IIR) filtering based methods or finite impulse response (FIR) filtering based methods. In addition, a spatial noise reduction technique of reducing noise using a high correlation between neighboring pixels in an image, and a temporal noise reduction technique of reducing noise using a high correlation between neighboring frames may be used.

SUMMARY

The present inventive concepts provide methods of processing images capable of efficiently performing temporal noise reduction operations using not only past frames but also future frames.

The present inventive concepts image processing devices performing the methods of processing the images.

According to some example embodiments, in a method of processing an image, a first composite frame image corresponding to an n-th input frame image is generated by performing a first temporal noise reduction operation based on the n-th input frame image and an (n−m)-th input frame image, where n is a natural number greater than or equal to two and m is a natural number smaller than n. The n-th input frame image and the (n−m)-th input frame image are included in a plurality of input frame images. The (n−m)-th input frame image is received prior to the n-th input frame image. A second composite frame image corresponding to the n-th input frame image is generated by performing a second temporal noise reduction operation based on the n-th input frame image and an (n+k)-th input frame image, where k is a natural number. The (n+k)-th input frame image is included in the plurality of input frame images and received subsequent to the n-th input frame image. The second composite frame image is provided as an n-th output frame image corresponding to the n-th input frame image.

According to some example embodiments, an image processing device includes a first processing circuitry and a second processing circuitry. The first processing circuitry is configured to generate a first composite frame image corresponding to an n-th input frame image by performing a first temporal noise reduction operation based on the n-th input frame image and an (n−m)-th input frame image, where n is a natural number greater than or equal to two and m is a natural number smaller than n. The n-th input frame image and the (n−m)-th input frame image are included in a plurality of input frame images. The (n−m)-th input frame image is received prior to the n-th input frame image. The second processing circuitry is configured to generate a second composite frame image corresponding to the n-th input frame image by performing a second temporal noise reduction operation based on the n-th input frame image and an (n+k)-th input frame image, where k is a natural number, and provides the second composite frame image as an n-th output frame image corresponding to the n-th input frame image. The (n+k)-th input frame image is included in the plurality of input frame images and received subsequent to the n-th input frame image.

According to some example embodiments, in a method of processing an image, a present motion vector associated with a present input frame image is obtained based on the present input frame image and a past input frame image. The past input frame image is received prior to the present input frame image. A first motion compensated frame image is obtained based on the present motion vector and a first composite frame image. The first composite frame image is a frame image to which an infinite impulse response filtering is applied to the past input frame image. A second composite frame image is obtained based on the present input frame image and the first motion compensated frame image. The second composite frame image is a frame image to which a first temporal noise reduction operation based on the infinite impulse response filtering is applied to the present input frame image. A present backward motion vector associated with the present input frame image is obtained based on the present input frame image and a future input frame image. The future input frame image is received subsequent to the present input frame image. A second motion compensated frame image is obtained based on the present backward motion vector and a third composite frame image. The third composite frame image is a frame image to which the infinite impulse response filtering is applied to the future input frame image. A fourth composite frame image is obtained based on the present input frame image and the second motion compensated frame image. The fourth composite frame image is a frame image to which a second temporal noise reduction operation based on a finite impulse response filtering is applied to the present input frame image. The fourth composite frame image is provided and stored as a present output frame image corresponding to the present input frame image. The present input frame image is an n-th input frame image among a plurality of input frame images, where n is a natural number greater than or equal to two. The past input frame image is an (n−1)-th input frame image that is received immediately before the n-th input frame image among the plurality of input frame images. The future input frame image is an (n+k)-th input frame image that is received after the n-th input frame image among the plurality of input frame images.

In the method of processing the image and the image processing device according to some example embodiments, the temporal noise reduction operation may be performed using not only the past frame but also the future frame. When the future frame is used for the synthesis, the closer the future frame to the present frame, the smaller the motion change and the irradiance change with the present frame. Accordingly, the degree of the noise reduction may increase without occurring the motion afterimage, and overall noise reduction performance may be improved or enhanced. For example, in video recording and/or storage scenarios in which frame delay is acceptable or allowable, a result of the infinite impulse response filtering for the future frame and a result of the infinite impulse response filtering for the present frame may be synthesized using the finite impulse response filtering based method, and thus the noise reduction performance may be improved.

BRIEF DESCRIPTION OF THE DRAWINGS

Illustrative, non-limiting example embodiments will be more clearly understood from the following detailed description taken in conjunction with the accompanying drawings.

FIG. 3 is a flowchart illustrating an example of generating a first composite frame image in FIG. 1 according to some example embodiments.

FIG. 4 is a flowchart illustrating an example of generating a second composite frame image in FIG. 1 according to some example embodiments.

FIG. 5 is a diagram for describing a method of processing an image according to some example embodiments.

FIGS. 7A and 7B are diagrams for describing an operation of FIG. 6 according to some example embodiments.

FIGS. 9A and 9B are diagrams for describing an operation of FIG. 8 according to some example embodiments.

FIG. 12 is a diagram for describing an operation of an image processing device according to some example embodiments.

FIGS. 16A and 16B are block diagrams illustrating an example of a motion estimation unit, a motion compensation unit and a temporal noise reduction unit included in first and second processing units of FIG. 15 according to some example embodiments.

DETAILED DESCRIPTION

Figure 1:
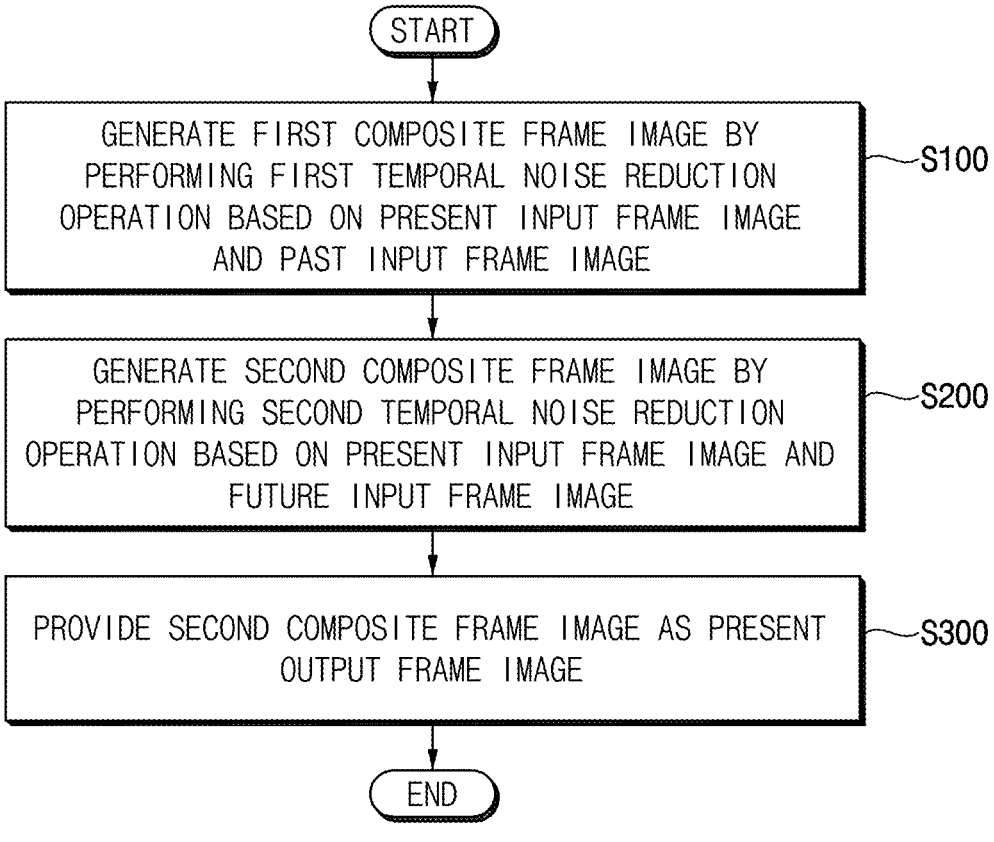
FIG. 1 is a flowchart illustrating a method of processing an image according to some example embodiments.

The present inventive concepts will be described more fully hereinafter with reference to the accompanying drawings, in which some example embodiments are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a flowchart illustrating a method of processing an image according to some example embodiments.

Referring to FIG. 1, a method of processing an image according to some example embodiments is performed on a video image including a plurality of frame images, and is performed by an image processing device that performs an image processing operation on the video image. For example, the image processing device may be an image recording device (or image storage device) that stores the video image. A configuration of the image processing device will be described with reference to FIG. 11.

In the method of processing the image according to some example embodiments, in operation S100, a first composite (or synthesized) frame image corresponding to a present (or current) input frame image is generated by performing a first temporal noise reduction (TNR) operation based on the present (or current) input frame image and a past (or previous) input frame image. Both the present (or current) input frame image and the past (or previous) input frame image may be included in the plurality of frame images, and the past (or previous) input frame image may be a frame image prior to (or earlier than) the present (or current) input frame image. For example, among the plurality of frame images, the present (or current) input frame image may be an n-th input frame image, where n is a natural number (or positive integer) greater than or equal to two, and the past (or previous) input frame image may be an (n−m)-th input frame image that is received before the n-th input frame image, where m is a natural number (or positive integer) less than n. For example, the past input frame image may be an (n−1)-th input frame image that is received immediately before the n-th input frame image (e.g., m=1), but example embodiments are not limited thereto.

In some example embodiments, the first temporal noise reduction operation may be an operation based on an infinite impulse response (IIR) filtering. Operation S100, according to some example embodiments, will be described with reference to FIG. 3.

According to some example embodiments, in operation S200, a second composite frame image corresponding to the present (or current) input frame image is generated by performing a second temporal noise reduction (TNR) operation based on the present (or current) input frame image and a future (or next) input frame image. In some example embodiments, as with the present (or current) input frame image and the past (or previous) input frame image, the future (or next) input frame image may be included in the plurality of frame images, and the future (or next) input frame image may be a frame image subsequent to (or later than) the present (or current) input frame image. For example, among the plurality of input frame images, the future (or next) input frame image may be an (n+k)-th input frame image that is received after the n-th input frame image, where k is a natural number (or positive integer). For example, the future (or next) input frame image may be an (n+3)-th input frame image that is received after the n-th input frame image (e.g., k=3), but example embodiments are not limited thereto.

In some example embodiments, the second temporal noise reduction (TNR) operation may be an operation based on a finite impulse response (FIR) filtering. Operation S200, according to some example embodiments, will be described with reference to FIG. 4.

According to some example embodiments, in operation S300, the second composite frame image is provided as a present output frame image corresponding to the present (or current) input frame image. For example, after the first temporal noise reduction (TNR) operation and the second temporal noise reduction (TNR) operation is performed, the present output frame image may be a frame image with reduced noise compared to the present (or current) input frame image.

According to some example embodiments, noise reduction is the process of removing noise from a signal. Noise reduction techniques exist for audio and images. For example, all signal processing devices, both analog and digital, have traits that make them susceptible to noise. For example, noise may be random with an even frequency distribution (white noise), or frequency-dependent noise introduced by a device's mechanism or signal processing algorithms. Noise reduction algorithms may be utilized to remove or mitigate the noise and may distort the signal to some degree.

Typically, noise may be added during a process of obtaining an image from an image sensor and a process of transmitting obtained image information through a channel. To remove added noise, various noise reduction operations such as a spatial noise reduction operation, a temporal noise reduction operation, and a spatiotemporal (or three-dimensional (3D)) noise reduction operation combining the spatial and temporal noise reduction operations have been researched. For example, the spatial noise reduction operation may be a technique of reducing noise using a high correlation between neighboring pixels in an image, and the temporal noise reduction operation may be a technique of reducing noise using a high correlation between neighboring frames. In addition, infinite impulse response filtering based methods and/or finite impulse response filtering based methods may be used.

In a conventional temporal noise reduction operation, a present frame was synthesized, combined or merged with past frames continuously and accumulately. Using the infinite impulse response filtering based synthesis, not only a past frame immediately before the present frame but also other past frames may be synthesized with differential weights applied depending on the infinite impulse response for the temporal noise reduction. Conventionally, if the synthesis intensity increases to achieve a desired, preferred, or advantageous degree of the noise reduction, there was a problem in that a motion afterimage occurs in low luminance environment. Further, to prevent the motion afterimage, there was a problem in that a degree of the noise reduction should be reduced.

In the method of processing the image according to some example embodiments, the temporal noise reduction operation may be performed using not only the past frame but also the future frame. For example, when the future frame is used for the synthesis, the closer the future frame is to the present frame, the smaller the motion change and the irradiance change with the present frame. Accordingly, in some example embodiments, the degree of the noise reduction may increase without occurring the motion afterimage, and overall noise reduction performance may be improved or enhanced. For example, in video recording and/or storage scenarios in which frame delay is acceptable or allowable, a result of the infinite impulse response filtering for the future frame and a result of the infinite impulse response filtering for the present frame may be synthesized using the finite impulse response filtering based method, and thus the noise reduction performance may be improved.

Figure 2:
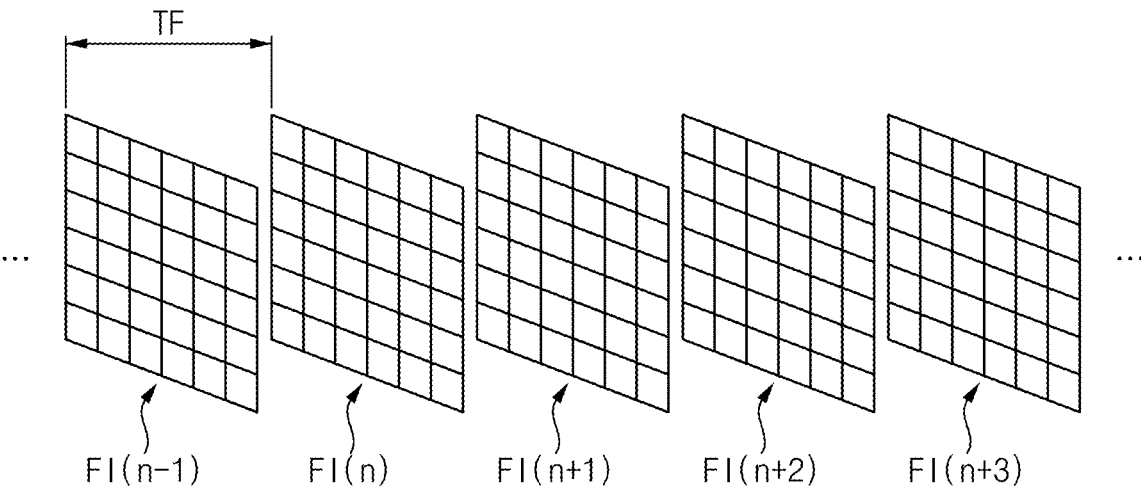
FIG. 2 is a diagram illustrating an example of a plurality of frame images used in a method of processing an image according to some example embodiments.

FIG. 2 is a diagram illustrating an example of a plurality of frame images used in a method of processing an image according to some example embodiments.

Referring to FIG. 2, an example of a plurality of frame images or a plurality of input frame images FI(n−1), FI(n), FI(n+1), FI(n+2) and FI(n+3) that are sequentially received over time is illustrated, where n is a natural number greater than or equal to two, but example embodiments are not limited thereto.

In some example embodiments, the plurality of input frame images FI(n−1) to FI(n+3) may be received with a constant frame rate (or driving frequency) and may have the same resolution. For example, a reciprocal of a time interval or a frame interval TF between adjacent input frame images (e.g., between the input frame images FI(n−1) and FI(n)) may correspond to the frame rate. For convenience of illustration, a resolution of one input frame image is illustrated by the number of small squares included in the one input frame image.

For example, among the plurality of input frame images FI(n−1) to FI(n+3), the n-th input frame image FI(n) may be the present (or current) input frame image in FIG. 1. In some example embodiments, one of the input frame images received prior to the n-th input frame image FI(n) among the plurality of input frame images FI(n−1) to FI(n+3) may be the past (or previous) input frame image in FIG. 1. In addition, in some example embodiments, one of the input frame images received subsequent to the n-th input frame image FI(n) among the plurality of input frame images FI(n−1) to FI(n+3) may be the future (or next) input frame image in FIG. 1.

In some example embodiments, the past (or previous) input frame image in FIG. 1 may be the (n−1)-th input frame image FI(n−1) received immediately before the n-th input frame image FI(n) among the plurality of input frame images FI(n−1) to FI(n+3) (e.g., m=1).

In some example embodiments, the future (or next) input frame image in FIG. 1 may be an (n+k)-th input frame image received after the n-th input frame image FI(n) among the plurality of input frame images FI(n−1) to FI(n+3), where k is a natural number. For example, the future input frame image in FIG. 1 may be the (n+3)-th input frame image FI(n+3) (e.g., k=3).

Hereinafter, some example embodiments will be described based on that m=1 and k=3, e.g., the (n−1)-th input frame image FI(n−1) and the (n+3)-th input frame image FI(n+3) are the past (or previous) input frame image and the future (or next) input frame image in FIG. 1, respectively. However, example embodiments are not limited thereto, and the future (or next) input frame image may be an arbitrary input frame image received after the n-th input frame image FI(n).

FIG. 3 is a flowchart illustrating an example of generating a first composite frame image in FIG. 1 according to some example embodiments.

Referring to FIGS. 1 and 3, according to some example embodiments, in operation S100, when generating the first composite frame image, a present motion vector associated with the present (or current) input frame image may be obtained based on the present (or current) input frame image and the past (or previous) input frame image in operation S110. In some example embodiments, the present motion vector may represent or indicate a difference between the present (or current) input frame image and the past (or previous) input frame image. For example, when the present (or current) input frame image is the n-th input frame image, the present motion vector may be an n-th motion vector.

According to some example embodiments, in operation S120, a first motion compensated frame image may be obtained based on the present motion vector and a third composite frame image corresponding to the past (or previous) input frame image. In some example embodiments, the first motion compensated frame image may be obtained by shifting the third composite frame image corresponding to the past (or previous) input frame image based on the present motion vector.

In some example embodiments, in operation S130, the first composite frame image to which the first temporal noise reduction (TNR) operation is applied may be obtained based on the present (or current) input frame image and the first motion compensated frame image. For example, the first composite frame image may be obtained by synthesizing, combining or merging the present (or current) input frame image and the first motion compensated frame image.

In some example embodiments, the first temporal noise reduction (TNR) operation may be an operation based on the infinite impulse response filtering. In some example embodiments, the first composite frame image may be a frame image to which the infinite impulse response filtering is applied to the present (or current) input frame image, e.g., a frame image to which an infinite impulse response merging is performed.

In some example embodiments, as with the first composite frame image, the third synthesized frame image may be a frame image to which the infinite impulse response filtering is applied to the past (or previous) input frame image.

Infinite impulse response scheme is a property applying to many linear time-invariant systems. Common examples of the linear time-invariant systems are most electronic and digital filters. Systems with this property are known as infinite impulse response systems or infinite impulse response filters, and are distinguished by having an impulse response which does not become exactly zero past a certain point, but continues indefinitely. This is in contrast to a finite impulse response in which the impulse response does become exactly zero after a finite duration. In the infinite impulse response scheme, a present output from a present input is generated using a result of a past output.

FIG. 4 is a flowchart illustrating an example of generating a second composite frame image in FIG. 1 according to some example embodiments.

Referring to FIGS. 1 and 4, in some example embodiments, when generating the second composite frame image (e.g., in operation S200), a present backward motion vector associated with the present input frame image may be obtained based on the present input frame image and the future input frame image in operation S210. According to some example embodiments, the present backward motion vector may represent a difference between the present (or current) input frame image and the future (or next) input frame image. According to some example embodiments, operation S210 may be similar to, for example, operation S110 in FIG. 3 in that the motion vector is obtained, except that a direction of the motion vector between the present (or current) input frame image and the past (or previous) input frame image is opposite to a direction of the motion vector between the present (or current) input frame image and the future (or previous) input frame image. To distinguish between the above-described two motion vectors (e.g., the present motion vector and the present backward motion vector), the motion vector obtained in S110 may be defined as the present motion vector, and the motion vector obtained in S210 may be defined as the present backward motion vector. For example, when the present (or current) input frame image is the n-th input frame image, the present backward motion vector may be an n-th backward motion vector, but example embodiments are not limited thereto.

According to some example embodiments, in operation S220, a second motion compensated frame image may be obtained based on the present backward motion vector and a fourth composite frame image corresponding to the future (or next) input frame image. In some example embodiments, the second motion compensated frame image may be obtained by shifting the fourth composite frame image corresponding to the future (or next) input frame image based on the present backward motion vector. Operation S220 according to some example embodiments may be similar to, for example, operation S120 illustrated in FIG. 3.

In some example embodiments, as with the first composite frame image and the third composite frame image, the fourth composite frame image may be a frame image to which the infinite impulse response filtering is applied to the future (or next) input frame image.

According to some example embodiments, in operation S230, the second composite frame image to which the second temporal noise reduction (TNR) operation is applied may be obtained based on the present (or current) input frame image and the second motion compensated frame image. For example, the second composite frame image may be obtained by synthesizing the first composite frame image corresponding to the present (or current) input frame image and the second motion compensated frame image. Operation S230 according to some example embodiments may be similar to, for example, operation S130 illustrated in FIG. 3.

In some example embodiments, unlike the first temporal noise reduction (TNR) operation, the second temporal noise reduction (TNR) operation may be an operation based on the finite impulse response filtering, but example embodiments are not limited thereto. For example, the second composite frame image may be a frame image to which the finite impulse response filtering is applied to the present (or current) input frame image, e.g., a frame image to which a finite impulse response merging is performed.

In signal processing, finite impulse response scheme is a technique in which impulse response (or response to any finite length input) is of finite duration, because it settles to zero in finite time. Systems with these properties are known as finite impulse response systems or finite impulse response filters. This is in contrast to infinite impulse response filters, which may have internal feedback and may continue to respond indefinitely (usually decaying). For example, the finite impulse response filters may be implemented in various manners, such as discrete-time or continuous-time method, digital or analog method, and/or the like.

In some example embodiments, components for performing operations S110, S120 and S130 in FIG. 3 may be implemented, and components for performing operations S210, S220 and S230 in FIG. 4 may be implemented separately and/or independently from the components for performing operations S110, S120 and S130 in FIG. 3.

In some example embodiments, since operations S110, S120 and S130 illustrated in FIG. 3 are similar to, for example, operations S210, S220 and S230 illustrated in FIG. 4, respectively, components for performing operations S110, S120 and S130 illustrated in FIG. 3 may be implemented to additionally perform operations S210, S220 and S230 illustrated in FIG. 4, but example embodiments are not limited thereto.

Figure 5:
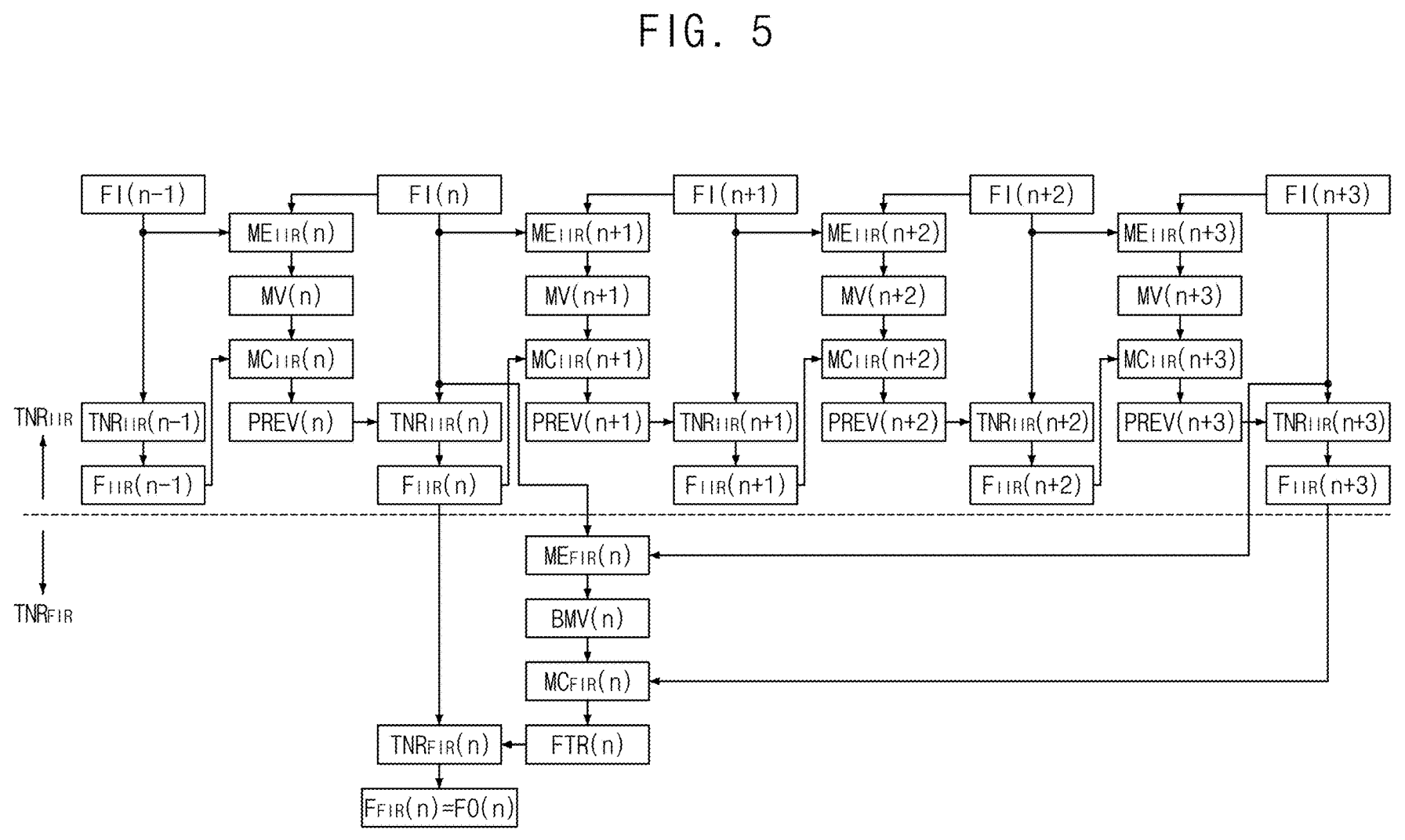

FIG. 5 is a diagram for describing a method of processing an image according to some example embodiments.

Referring to FIG. 5, an example where the method of processing the image according to some example embodiments is performed when the plurality of input frame images FI(n−1) to FI(n+3) in FIG. 2 are sequentially received is illustrated.

In FIG. 5, in some example embodiments, the (n−1)-th input frame image FI(n−1), the n-th input frame image FI(n) and the (n+3)-th input frame image FI(n+3) may be the past (or previous) input frame image, the present (or current) input frame image and the future (or next) input frame image, respectively. In addition, in some example embodiments, operations above a dotted line may represent or correspond to first temporal noise reduction operations $TNR_{IIR}$, e.g., noise reduction operations based on the infinite impulse response filtering, and operations below the dotted line may represent or correspond to second temporal noise reduction operations $TNR_{FIR}$, e.g., noise reduction operations based on the finite impulse response filtering.

In some example embodiments, when the n-th input frame image FI(n) is received, the first temporal noise reduction operation $TNR_{IIR}$ may be performed on the n-th input frame image FI(n), for example, as in S100 illustrated in FIG. 1, based on the n-th input frame image FI(n) and the (n−1)-th input frame image FI(n−1) that is received prior to the n-th input frame image FI(n).

For example, in some example embodiments as in S110, a motion estimation operation $ME_{IIR}(n)$ may be performed based on the (n−1)-th input frame image FI(n−1) and the n-th input frame image FI(n), and thus an n-th motion vector MV(n) may be obtained. Thereafter, in some example embodiments as illustrated in S120, a motion compensation operation $MC_{IIR}(n)$ may be performed based on the n-th motion vector MV(n) and a composite frame image $F_{IIR}(n-1)$ corresponding to the (n−1)-th input frame image FI(n−1), and thus a motion compensated frame image PREV(n) may be obtained. According to some example embodiments, the composite frame image $F_{IIR}(n-1)$ may be a frame image obtained by performing a first temporal noise reduction operation $TNR_{IIR}(n-1)$ on the (n−1)-th input frame image FI(n−1). Thereafter, in some example embodiments, for example, as illustrated in S130 of FIG. 3, a first temporal noise reduction operation (e.g., merging operation) $TNR_{IIR}(n)$ may be performed based on the n-th input frame image FI(n) and the motion compensated frame image PREV(n), and thus a composite frame image FIR(n) may be acquired. According to some example embodiments, n-th motion vector MV(n) may correspond to, for example, the present motion vector illustrated in S110 of FIG. 3, the composite frame image $F_{IIR}(n-1)$ and the motion compensated frame image PREV(n) may correspond to the third composite frame image and the first motion compensated frame image illustrated in S120 of FIG. 3, respectively, and the composite frame image $F_{IIR}(n)$ may correspond to the first composite frame image in S130 illustrated in FIG. 3. In some example embodiments, the composite frame images FIR(n−1) and $F_{IIR}(n)$ may be frame images to which the infinite impulse response filtering is applied, e.g., frame images to which the infinite impulse response merging is performed.

Similarly, in some example embodiments, when the (n+1)-th input frame image FI(n+1), the (n+2)-th input frame image FI(n+2) and the (n+3)-th input frame image FI(n+3) are sequentially received, the first temporal noise reduction operation $TNR_{IIR}$ may be sequentially performed on the (n+1)-th input frame image FI(n+1), the (n+2)-th input frame image FI(n+2) and the (n+3)-th input frame image FI(n+3) as in S100 illustrated in FIG. 1.

For example, according to some example embodiments, with respect to the (n+1)-th input frame image FI(n+1), for example, as in S110 illustrated in FIG. 3, a motion estimation operation $ME_{IIR}(n+1)$ may be performed based on the n-th input frame image FI(n) and the (n+1)-th input frame image FI(n+1), and thus an (n+1)-th motion vector MV(n+1) may be obtained. Thereafter, for example, as in operation S120 illustrated in FIG. 3, a motion compensation operation $MC_{IIR}(n+1)$ may be performed based on the (n+1)-th motion vector MV(n+1) and the composite frame image FIR(n) corresponding to the n-th input frame image FI(n), and thus a motion compensated frame image PREV(n+1) may be obtained. Thereafter, for example, as in operation S130 illustrated in FIG. 3, a first temporal noise reduction operation $TNR_{IIR}(n+1)$ may be performed based on the (n+1)-th input frame image FI(n+1) and the motion compensated frame image PREV(n+1), and thus a composite frame image $F_{IIR}(n+1)$ may be obtained.

In some example embodiments, with respect to the (n+2)-th input frame image FI(n+2), for example, as in operation S110 illustrated in FIG. 3, a motion estimation operation $ME_{IIR}(n+2)$ may be performed based on the (n+1)-th input frame image FI(n+1) and the (n+2)-th input frame image FI(n+2), and thus an (n+2)-th motion vector MV(n+2) may be obtained. Thereafter, for example, as in operation S120 illustrated in FIG. 3, a motion compensation operation $MC_{IIR}(n+2)$ may be performed based on the (n+2)-th motion vector MV(n+2) and the composite frame image $F_{IIR}(n+1)$ corresponding to the (n+1)-th input frame image FI(n+1), and thus a motion compensated frame image PREV(n+2) may be obtained. Thereafter, for example, as in operation S130 illustrated in FIG. 3, a first temporal noise reduction operation $TNR_{IIR}(n+2)$ may be performed based on the (n+2)-th input frame image FI(n+2) and the motion compensated frame image PREV(n+2), and thus a composite frame image $F_{IIR}$(n+2) may be obtained.

In some example embodiments, with respect to the (n+3)-th input frame image FI(n+3), for example, as in operation S110 illustrated in FIG. 3, a motion estimation operation $ME_{IIR}$(n+3) may be performed based on the (n+2)-th input frame image FI(n+2) and the (n+3)-th input frame image FI(n+3), and thus an (n+3)-th motion vector MV(n+3) may be obtained. Thereafter, for example, as in operation S120 illustrated in FIG. 3, a motion compensation operation $MC_{IIR}$(n+3) may be performed based on the (n+3)-th motion vector MV(n+3) and the composite frame image $F_{IIR}$(n+2) corresponding to the (n+2)-th input frame image FI(n+2), and thus a motion compensated frame image PREV(n+3) may be obtained. Thereafter, for example, as in operation S130 illustrated in FIG. 3, a first temporal noise reduction operation $TNR_{IIR}$(n+3) may be performed based on the (n+3)-th input frame image FI(n+3) and the motion compensated frame image PREV(n+3), and thus a composite frame image $F_{IIR}$(n+3) may be obtained.

According to some example embodiments, as with the composite frame images $F_{IIR}$(n−1) and FIR(n), the composite frame images FIR(n+1), FIR(n+2) and $F_{IIR}$(n+3) may be frame images to which the infinite impulse response filtering is applied, e.g., frame images to which the infinite impulse response merging is performed.

As described above, in some example embodiments, in the first temporal noise reduction operations $TNR_{IIR}$ above the dotted line, e.g., in the noise reduction operations based on the infinite impulse response filtering, the motion vector may be calculated by comparing the present (or current) frame with the past (or previous) frame, the past compensated frame in which the motion alignment is performed may be generated by compensating the past IIR merging frame using the motion vector, and the present frame and the past compensated frame may be merged. Therefore, the IIR filtering may be efficiently implemented.

In addition, according to some example embodiments, when the (n+3)-th input frame image FI(n+3) is received, the second temporal noise reduction operation $TNR_{FIR}$ may be performed on the n-th input frame image FI(n), for example, as in operation S200 illustrated in FIG. 1, based on the n-th input frame image FI(n) and the (n+3)-th input frame image FI(n+3) that is received subsequent the n-th input frame image FI(n).

In some example embodiments, for example, as in operation S210 illustrated in FIG. 4, a motion estimation operation $ME_{FIR}$(n) may be performed based on the n-th input frame image FI(n) and the (n+3)-th input frame image FI(n+3), and thus an n-th backward motion vector BMV(n) may be obtained. Thereafter, in some example embodiments, for example, as in operation S220 illustrated in FIG. 4, a motion compensation operation $MC_{FIR}$(n) may be performed based on the n-th backward motion vector BMV (n) and the composite frame image $F_{IIR}$(n+3) corresponding to the (n+3)-th input frame image FI(n+3), and thus a motion compensated frame image FTR(n) may be obtained. Thereafter, in some example embodiments, for example, as in operation S230 illustrated in FIG. 4, a second temporal noise reduction operation (e.g., merging operation) $TNR_{FIR}$(n) may be performed based on the composite frame image $F_{IIR}$(n) corresponding to the n-th input frame image FI(n) and the motion compensated frame image FTR(n), and thus a composite frame image $F_{FIR}$(n) may be obtained. In some example embodiments, the n-th backward motion vector BMV(n) may correspond to the present backward motion vector, for example, in operation S210 illustrated in FIG. 4, the composite frame image $F_{IIR}$(n+3) and the motion compensated frame image FTR(n) may correspond to the fourth composite frame image and the second motion compensated frame image, for example, in operation S220 illustrated in FIG. 4, respectively, and the composite frame image $F_{FIR}$(n) may correspond to the second composite frame image, for example, in operation S230 illustrated in FIG. 4. According to some example embodiments, the composite frame image $F_{FIR}$(n) may be a frame image to which the finite impulse response filtering is applied, e.g., a frame image to which the finite impulse response merging is performed. According to some example embodiments, the composite frame image $F_{FIR}$(n) may be provided as an n-th output frame image FO(n) corresponding to the n-th input frame image FI(n).

According to some example embodiments, as described above, in the second temporal noise reduction operations $TNR_{FIR}$ below the dotted line, e.g., in the noise reduction operations based on the finite impulse response filtering, the future (or next) frame may be additionally used. For example, the backward motion vector may be calculated by comparing the present frame with the future frame, the future compensated frame in which the motion alignment is performed may be generated by compensating the future IIR merging frame using the backward motion vector, and the final present frame may be generated by merging the current IIR merging frame and the future compensated frame. Therefore, the final present frame may have the same effect as the FIR filtering is performed.

In addition, in some example embodiments, as described above, operation S100 illustrated in FIG. 1 may be performed when the n-th input frame image FI(n), which is the present input frame image, is received, and operation S200 illustrated in FIG. 1 may be performed when the (n+3)-th input frame image FI(n+3), which is the future input frame image, is received. Therefore, in some example embodiments, the frame delay may be essentially required and/or advantageous to perform the method of processing the image according to some example embodiments. For example, the method of processing the image according to example embodiments may be applied or employed to the video recording and/or storage scenarios in which the frame delay is acceptable or allowable, but example embodiments are not limited thereto.

Although not illustrated in FIG. 5, in some example embodiments, when the (n+2)-th input frame image FI(n+2) is received, the second temporal noise reduction operation $TNR_{FIR}$ may be performed on the (n−1)-th input frame image FI(n−1). In some example embodiments, when an (n+4)-th input frame image is received, the second temporal noise reduction operation $TNR_{FIR}$ may be performed on the (n+1)-th input frame image FI(n+1). In some example embodiments, an (n+5)-th input frame image is received, the second temporal noise reduction operation $TNR_{FIR}$ may be performed on the (n+2)-th input frame image FI(n+2). In some example embodiments, an (n+6)-th input frame image is received, the second temporal noise reduction operation $TNR_{FIR}$ may be performed on the (n+3)-th input frame image FI(n+3).

Figure 6:
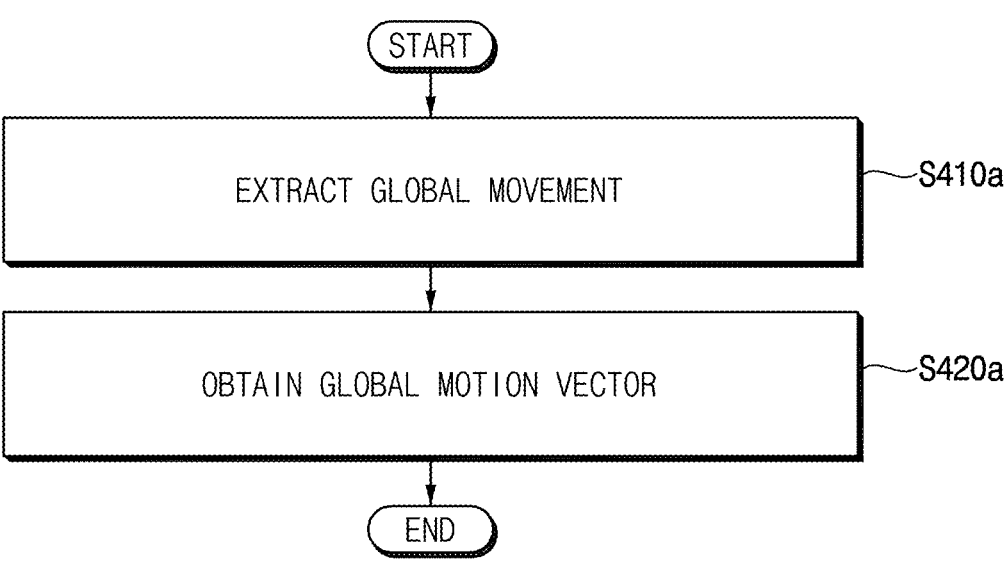
FIG. 6 is a flowchart illustrating an example of obtaining a present motion vector in FIG. 3 and an example of obtaining a present backward motion vector in FIG. 4 according to some example embodiments.
Figure 7B:
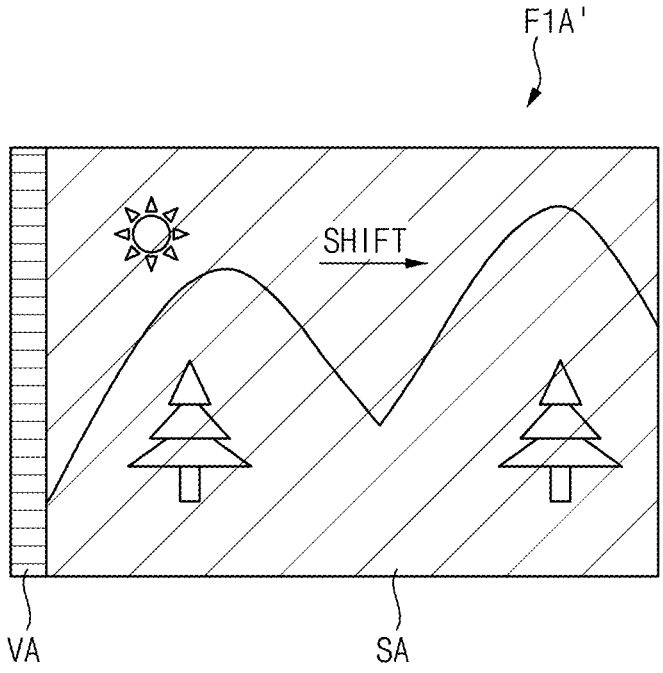

FIG. 6 is a flowchart illustrating an example of obtaining a present motion vector in FIG. 3 and an example of obtaining a present backward motion vector in FIG. 4 according to some example embodiments. FIGS. 7A and 7B are diagrams for describing an operation of FIG. 6 according to some example embodiments.

Referring to FIG. 6, in some example embodiments, in operation S410a when obtaining a motion vector between two frame images, a global (or overall) movement between the two frame images may be extracted, and in operation S420a a global motion vector corresponding to the global movement may be obtained as the motion vector.

For example, according to some example embodiments, when obtaining the present motion vector in operation S110 illustrated in FIG. 3, a first global movement between the present (or current) input frame image and the past (or previous) input frame image may be extracted, for example, in operation S410a illustrated in FIG. 6, and a first global motion vector corresponding to the first global movement may be obtained, for example, in operation S420a illustrated in FIG. 6, as the present motion vector.

For example, according to some example embodiments, when obtaining the present backward motion vector in operation S210 illustrated in FIG. 4, a second global movement between the present (or current) input frame image and the future (or next) input frame image may be extracted, for example, in operation S410a illustrated in FIG. 6, and a second global motion vector corresponding to the second global movement may be obtained, for example, in operation S420a illustrated in FIG. 6, as the present backward motion vector.

Referring to FIGS. 7A and 7B, in some example embodiments, a first frame image F1A and a second frame image F2A, which are examples of the two frame images described with reference to FIG. 6, are illustrated. In some example embodiments, the second frame image F2A may be the present (or current) input frame image in FIGS. 3 and 4, and the first frame image F1A may be the past (or previous) input frame image in FIG. 3 or the future (or next) input frame image in FIG. 4.

In FIG. 7A, in some example embodiments, when compared with the first frame image F1A, the second frame image F2A may have a scene including the sun, mountains and trees as a whole shifted or moved to the right direction. The dotted lines in the second frame image F2A in FIG. 7A may indicate positions of the sun, mountains and trees in the first frame image F1A. A global movement GM between the first frame image F1A and the second frame image F2A may be extracted by comparing and/or analyzing the first frame image F1A and the second frame image F2A. For example, the global movement GM may be obtained in the form of the global motion vector.

In FIG. 7B, in some example embodiments, a shifted first frame image F1A' may be obtained by shifting the first frame image F1A in FIG. 7A to the right direction based on the global motion vector. This operation may correspond to, for example, the motion compensation operation of S120 illustrated in FIG. 3 and operation S220 illustrated in FIG. 4.

In some example embodiments, by the shift operation as illustrated in FIG. 7B, the shifted first frame image F1A' may include a shifted area SA and a virtual area VA. The shifted area SA may be substantially the same as a portion of the first frame image F1A. According to some example embodiments, the virtual area VA may be a portion that is not actually included in the first frame image F1A. For example, the virtual area VA may be obtained by performing an image interpolation, or the like based on the first frame image F1A. Alternatively, when a size of the virtual area VA is relatively small, the virtual area VA may be obtained by copying a portion of the first frame image F1A as it is, or may be empty without any image processing.

According to some example embodiments, after the shifted first frame image F1A' is obtained, a composite frame image may be obtained by merging the shifted first frame image F1A' and the second frame image F2A. In some example embodiments, this operation may correspond to the temporal noise reduction operation of, for example, S130 illustrated in FIGS. 3 and S230 illustrated in FIG. 4.

Figure 8:
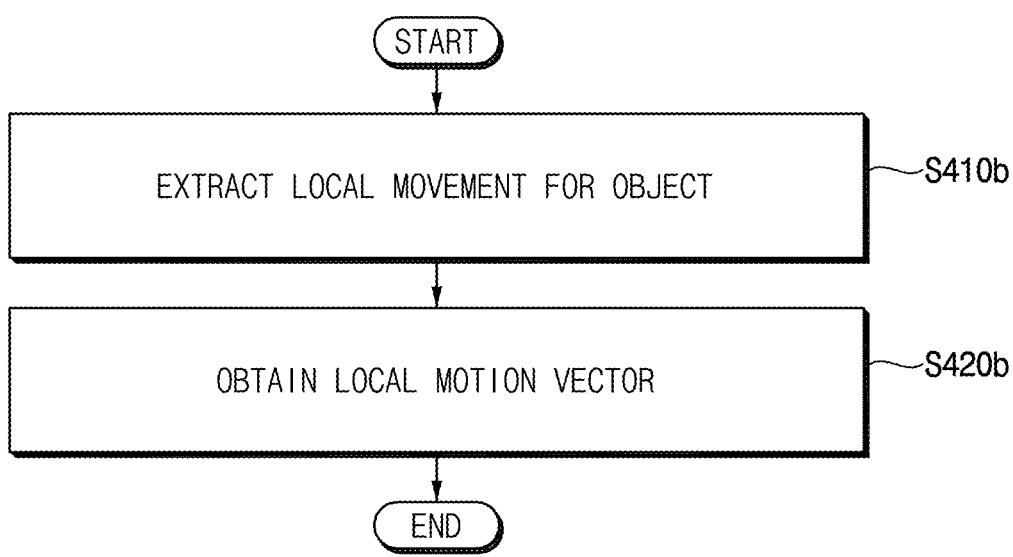
FIG. 8 is a flowchart illustrating an example of obtaining a present motion vector in FIG. 3 and an example of obtaining a present backward motion vector in FIG. 4 according to some example embodiments.
Figure 9B:
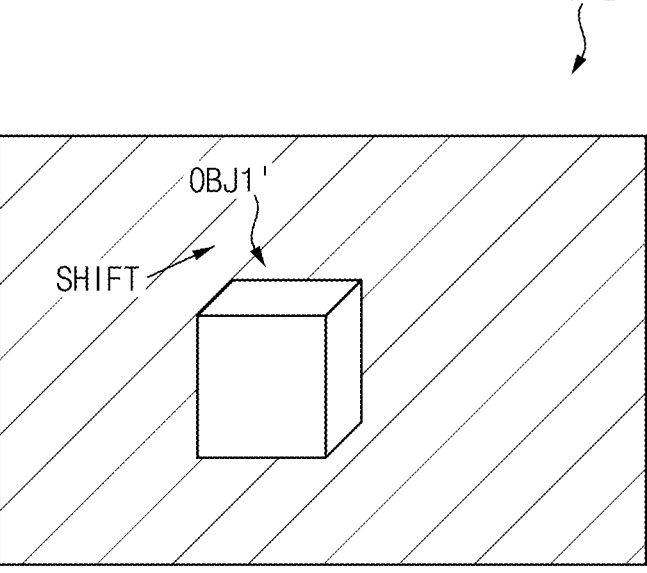

FIG. 8 is a flowchart illustrating an example of obtaining a present motion vector in FIG. 3 and an example of obtaining a present backward motion vector in FIG. 4 according to some example embodiments. FIGS. 9A and 9B are diagrams for describing an operation of FIG. 8 according to some example embodiments. The descriptions repeated with FIGS. 6, 7A and 7B will be omitted.

Referring to FIG. 8, in some example embodiments, when obtaining a motion vector between two frame images, a local (or individual) movement for at least one object among a plurality of objects included in the two frame images may be extracted (operation S410b), and a local motion vector corresponding to the local movement may be obtained as the motion vector (operation S420b).

For example, when obtaining the present motion vector in FIG. 3 (operation S110), a first local movement for a first object among a plurality of objects included in both the present (or current) input frame image and the past (or previous) input frame image may be extracted, and a first local motion vector corresponding to the first local movement may be obtained as the present motion vector.

For example, when obtaining the present backward motion vector in FIG. 4 (operation S210), a second local movement for a second object among a plurality of objects included in both the present (or current) input frame image and the future (or next) input frame image may be extracted, and a second local motion vector corresponding to the second local movement may be obtained as the present backward motion vector.

Referring to FIGS. 9A and 9B, in some example embodiments, a first frame image F1B and a second frame image F2B, which are examples of the two frame images described with reference to FIG. 8, are illustrated. For example, the second frame image F2B may be the present (or current) input frame image in FIGS. 3 and 4, and the first frame image F1B may be the past (or previous) input frame image in FIG. 3 or the future (or next) input frame image in FIG. 4.

In FIG. 9A, in some example embodiment, when compared with the first frame image F1B, the second frame image F2B may include a first object OBJ1 moved or shifted to the right direction. The dotted lines in the second frame image F2B in FIG. 9A may indicate a position of the first object OBJ1 in the first frame image F1B. The remaining portion of the image (e.g., a background) other than the first object OBJ1 may not be shifted, or may be displayed substantially the same without any difference between the first frame image F1B and the second frame image F2B even if it is shifted. In some example embodiments, the local movement LM for the first object OBJ1 between the first frame image F1B and the second frame image F2B may be extracted by comparing and/or analyzing the first frame image F1B and the second frame image F2B. For example, the local movement LM may be obtained in the form of the local motion vector.

In FIG. 9B, in some example embodiments, a shifted first frame image F1B' including a shifted first object OBJ1' may be obtained by shifting the first object OBJ1 included in the first frame image F1B in FIG. 9A to the right direction based on the local motion vector. This operation may correspond to the motion compensation operation of, for example, S120 illustrated in FIGS. 3 and S220 illustrated in FIG. 4.

In some example embodiments, although not illustrated in detail, as with that described with reference to FIG. 7B, the shifted first frame image F1B' including the shifted first object OBJ1' may include a virtual area by shifting the first object OBJ1', and the virtual area may be obtained by performing an image interpolation based on the first frame image F1B, may be obtained by copying a portion of the first frame image FIB as it is, or may be empty without any image processing.

Although FIGS. 9A and 9B illustrate example embodiments where the two frame images include one object, example embodiments are not limited thereto. For example, in some example embodiments, the two frame images may include two or more objects, each of local movements may be extracted for a respective one of the objects, each of the objects may be shifted based on a respective one of the local movements, and the shifted frame image including the shifted objects and another frame image may be merged with each other.

Although a first scheme for extracting the global movement between the two frame images and performing the image merging operation based on the global movement is described with reference to FIGS. 6, 7A and 7B, and although a second scheme for extracting the local movement for the object between the two frame images and performing the image merging operation based on the local movement is described with reference to FIGS. 8, 9A and 9B, example embodiments are not limited thereto. For example, in some example embodiments, both the first scheme and the second scheme may be used at one time to perform the image merging operation. In addition, in some example embodiments, at least one of various algorithms for synthesizing frame images may be additionally used to perform the image merging operation.

Figure 10:
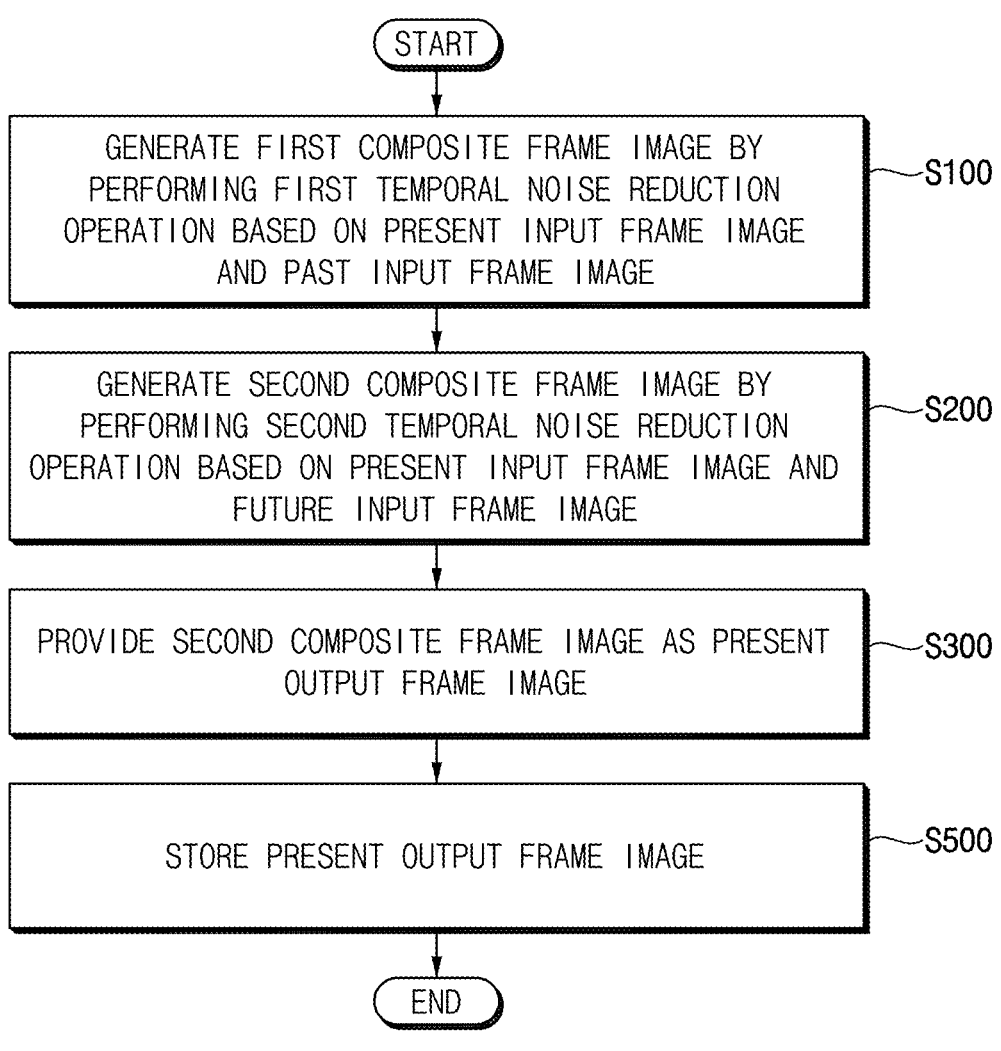
FIG. 10 is a flowchart illustrating a method of processing an image according to some example embodiments.

FIG. 10 is a flowchart illustrating a method of processing an image according to some example embodiments. The descriptions repeated with FIG. 1 will be omitted.

Referring to FIG. 10, in a method of processing an image according to some example embodiments, operations S100, S200 and S300 may be substantially the same as those (e.g., operations S100, S200, and S300) described with reference to FIG. 1.

In some example embodiments, the present output frame image may be stored (operation S5000). As described above, the method of processing the image according to some example embodiments may be applied or employed to the video recording and/or storage scenarios in which the frame delay is acceptable or allowable.

In the method of processing the image according to some example embodiments, the IIR merging result of the future frame may be combined with the IIR merging result of the present frame using the FIR merging. Theoretically, the IIR impulse response of the TNR is infinite, but realistically, about 5 past frames may be merged by parameter setting. If, for example, 5 future frames are additionally merged, the noise variance may be reduced to about ½. According to some example embodiments, to reduce the noise variance to about ½, the IIR merging result of the future frame may be combined with the IIR merging result of the present frame using the FIR merging. When the future frames are additionally merged according to some example embodiments, the noise reduction performance may be improved while mitigating the motion afterimage problem.

As will be appreciated by those skilled in the art, the described example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 11:
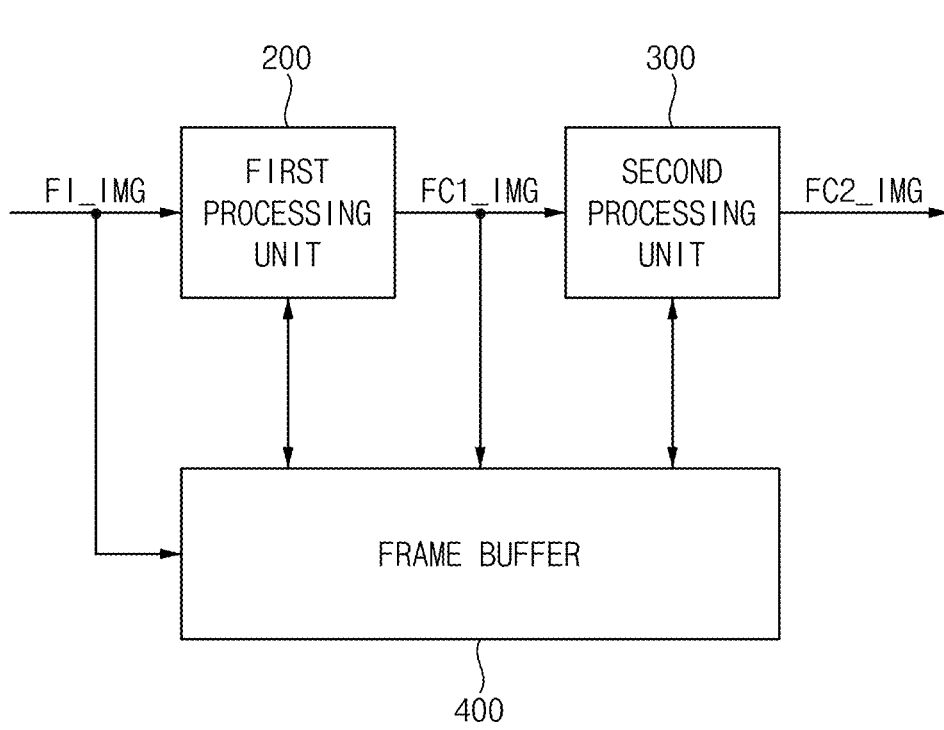
FIG. 11 is a block diagram illustrating an image processing device according to some example embodiments.

FIG. 11 is a block diagram illustrating an image processing device according to some example embodiments.

Referring to FIG. 11, in some example embodiments, an image processing device 100 includes a first processing unit (or circuit) 200 and a second processing unit (or circuit) 300. The image processing device 100 may further include a frame buffer 400, but example embodiments are not limited thereto.

In some example embodiments, the first processing unit 200 receives a plurality of input frame images FI_IMG, and generates a plurality of composite frame images FC1_IMG by performing a first temporal noise reduction operation on the plurality of input frame images FI_IMG. For example, the first processing unit 200 may generate a first composite frame image corresponding to a present (or current) input frame image by performing the first temporal noise reduction operation based on the present (or current) input frame image and a past (or previous) input frame image received before the present (or current) input frame image. In other words, the first processing unit 200 may perform operation S100 in FIG. 1. For example, the first temporal noise reduction operation may be an operation based on an infinite impulse response filtering. For example, as described with reference to FIGS. 2 and 5, the plurality of input frame images FI_IMG may include the input frame images FI(n−1) to FI(n+3).

In some example embodiments, the second processing unit 300 receives the plurality of composite frame images FC1_IMG, generates a plurality of composite frame images FC2_IMG by performing a second temporal noise reduction operation on the plurality of input frame images FI_IMG (e.g., on the plurality of composite frame images FC1_IMG), and provides a plurality of composite frame images FC2_IMG as a plurality of output frame images. For example, the second processing unit 300 may generate a second composite frame image corresponding to the present (or current) input frame image by performing the second temporal noise reduction operation based on the present (or current) input frame image and a future (or next) input frame image received after the present (or current) input frame image, and may provide the second composite frame image as a present output frame image corresponding to the present (or current) input frame image. In other words, the second processing unit 300 may perform operations S200 and S300 in FIG. 1. For example, the second temporal noise reduction operation may be an operation based on a finite impulse response filtering.

In some example embodiments, at least a part of the first processing unit 200 and the second processing unit 300 may include or be implemented as respective processing circuitry such as hardware (e.g., logic circuits) or a combination of hardware and software (e.g., a computer-based electronic system like a processor executing instruction codes or program routines (e.g., a software program)). The instruction codes or the program routines may be stored in any storage device located inside or outside the computer-based electronic system.

In some example embodiments, the frame buffer 400 may store and output the plurality of input frame images FI_IMG, and may store and output the plurality of composite frame images FC1_IMG. In some example embodiments, while the first and second processing units 200 and 300 perform the first and second temporal noise reduction operations, frame images may need to be continuously/repetitively input and output, and the frame buffer 400 may temporarily store or output frame images in relation to the operations of the first and second processing units 200 and 300, but example embodiments are not limited thereto.

In some example embodiments, the frame buffer 400 may include at least one of various volatile memories, e.g., a dynamic random access memory (DRAM), a static random access memory (SRAM), etc. and/or at least one of various nonvolatile memories, e.g., a flash memory a phase random access memory (PRAM), a resistive random access memory (RRAM), a magnetic random access memory (MRAM), a ferroelectric random access memory (FRAM), a nano floating gate memory (NFGM), a polymer random access memory (PoRAM), a thyristor random access memory (TRAM), etc., but example embodiments are not limited thereto.

FIG. 12 is a diagram for describing an operation of an image processing device according to some example embodiments.

Referring to FIG. 12, according to some example embodiments, an example of first processing operations P_IIR of the first processing unit 200 and second processing operations P_FIR of the second processing unit 300 when the plurality of input frame images FI(n−1) to FI(n+3) are sequentially received is illustrated. In some example embodiments, as described with reference to FIG. 5, the (n−1)-th input frame image FI(n−1), the n-th input frame image FI(n) and the (n+3)-th input frame image FI(n+3) may be the past (or previous) input frame image, the present (or current) input frame image and the future (or next) input frame image, respectively.

In some example embodiments, the first processing operations P_IIR of the first processing unit 200 may include a motion estimation operation $ME_{IIR}$, a motion compensation operation $MC_{IIR}$ and a temporal noise reduction operation $TNR_{IIR}$.

In some example embodiments, in an n-th frame interval TF(n) during which the n-th input frame image FI(n) is received, the motion estimation operation $ME_{IIR}$, the motion compensation operation $MC_{IIR}$ and the temporal noise reduction operation $TNR_{IIR}$ may be performed, and thus a motion vector MV(n), a motion compensated frame image PREV(n) and a composite frame image FIR(n) may be obtained. Similarly, in some example embodiments, in an (n+1)-th frame interval TF(n+1) during which the (n+1)-th input frame image FI(n+1) is received, the motion estimation operation $ME_{IIR}$, the motion compensation operation $MC_{IIR}$ and the temporal noise reduction operation $TNR_{IIR}$ may be performed, and thus a motion vector MV(n+1), a motion compensated frame image PREV(n+1) and a composite frame image $F_{IIR}(n+1)$ may be obtained. In some example embodiments, in an (n+2)-th frame interval TF(n+2) during which the (n+2)-th input frame image FI(n+2) is received, the motion estimation operation $ME_{IIR}$, the motion compensation operation $MC_{IIR}$ and the temporal noise reduction operation $TNR_{IIR}$ may be performed, and thus a motion vector MV(n+2), a motion compensated frame image PREV(n+2) and a composite frame image $F_{IIR}(n+2)$ may be obtained. In some example embodiments, in an (n+3)-th frame interval TF(n+3) during which the (n+3)-th input frame image FI(n+3) is received, the motion estimation operation $ME_{IIR}$, the motion compensation operation $MC_{IIR}$ and the temporal noise reduction operation $TNR_{IIR}$ may be performed, and thus a motion vector MV(n+3), a motion compensated frame image PREV(n+3) and a composite frame image $F_{IIR}(n+3)$ may be obtained.

According to some example embodiments, as with the first processing operations P_IIR, the second processing operations P_FIR of the second processing unit 300 may include a motion estimation operation $ME_{FIR}$, a motion compensation operation $MC_{FIR}$ and a temporal noise reduction operation $TNR_{FIR}$.

In some example embodiments, the n-th frame interval TF(n), the motion estimation operation $ME_{FIR}$, the motion compensation operation $MC_{FIR}$ and the temporal noise reduction operation $TNR_{FIR}$ may be performed, and thus a backward motion vector BMV(n−3), a motion compensated frame image FTR(n−3) and a composite frame image $F_{FIR}$ (n−3) may be obtained. In some example embodiments, in the (n+1)-th frame interval TF(n+1), the motion estimation operation $ME_{FIR}$, the motion compensation operation $MC_{FIR}$ and the temporal noise reduction operation $TNR_{FIR}$ may be performed, and thus a backward motion vector BMV(n−2), a motion compensated frame image FTR(n−2) and a composite frame image $F_{FIR}(n−2)$ may be obtained. In some example embodiments, in the (n+2)-th frame interval TF(n+2), the motion estimation operation $ME_{FIR}$, the motion compensation operation $MC_{FIR}$ and the temporal noise reduction operation $TNR_{FIR}$ may be performed, and thus a backward motion vector BMV(n−1), a motion compensated frame image FTR(n−1) and a composite frame image $F_{FIR}(n−1)$ may be obtained. In some example embodiments, in the (n+3)-th frame interval TF(n+3), the motion estimation operation $ME_{FIR}$, the motion compensation operation $MC_{FIR}$ and the temporal noise reduction operation $TNR_{FIR}$ may be performed, and thus a backward motion vector BMV(n), a motion compensated frame image FTR(n) and a composite frame image $F_{FIR}(n)$ may be obtained.

According to some example embodiments, the composite frame images $F_{IIR}(n)$, FIR(n+1), FIR(n+2) and FIR(n+3) may correspond to the plurality of composite frame images FC1_IMG in FIG. 11, and the composite frame images $F_{FIR}(n−3)$, $F_{FIR}(n−2)$, $F_{FIR}(n−1)$ and $F_{FIR}(n)$ may correspond to the plurality of composite frame images FC2_IMG in FIG. 11.

In some example embodiments, the first processing operation P_IIR and the second processing operation P_FIR that are performed in one frame interval may be substantially simultaneously performed. For example, in the (n+3)-th frame interval TF(n+3), the first processing operation P_IIR for generating the motion vector MV(n+3), the motion compensated frame image PREV(n+3) and the composite frame image $F_{IIR}(n+3)$ and the second processing operation P_FIR for generating the backward motion vector BMV(n), the motion compensated frame image FTR(n) and the composite frame image $F_{FIR}(n)$ may be substantially simultaneously performed.

In some example embodiments, the first processing operation P_IIR and the second processing operation P_FIR that are performed in one frame interval may be sequentially performed. For example, in the (n+3)-th frame interval TF(n+3), the first processing operation P_IIR for generating the motion vector MV(n+3), the motion compensated frame image PREV(n+3) and the composite frame image $F_{IIR}(n+3)$ may be performed first, and then the second processing operation P_FIR for generating the backward motion vector BMV(n), the motion compensated frame image FTR(n) and the composite frame image $F_{FIR}(n)$ may be performed later, but example embodiments are not limited thereto.

Although one frame interval is described as a time interval for receiving one frame image, example embodiments are not limited thereto. For example, a time interval required to completely perform one first processing operation P_IIR and one second processing operation P_FIR may be defined as one frame interval.

Figure 13:
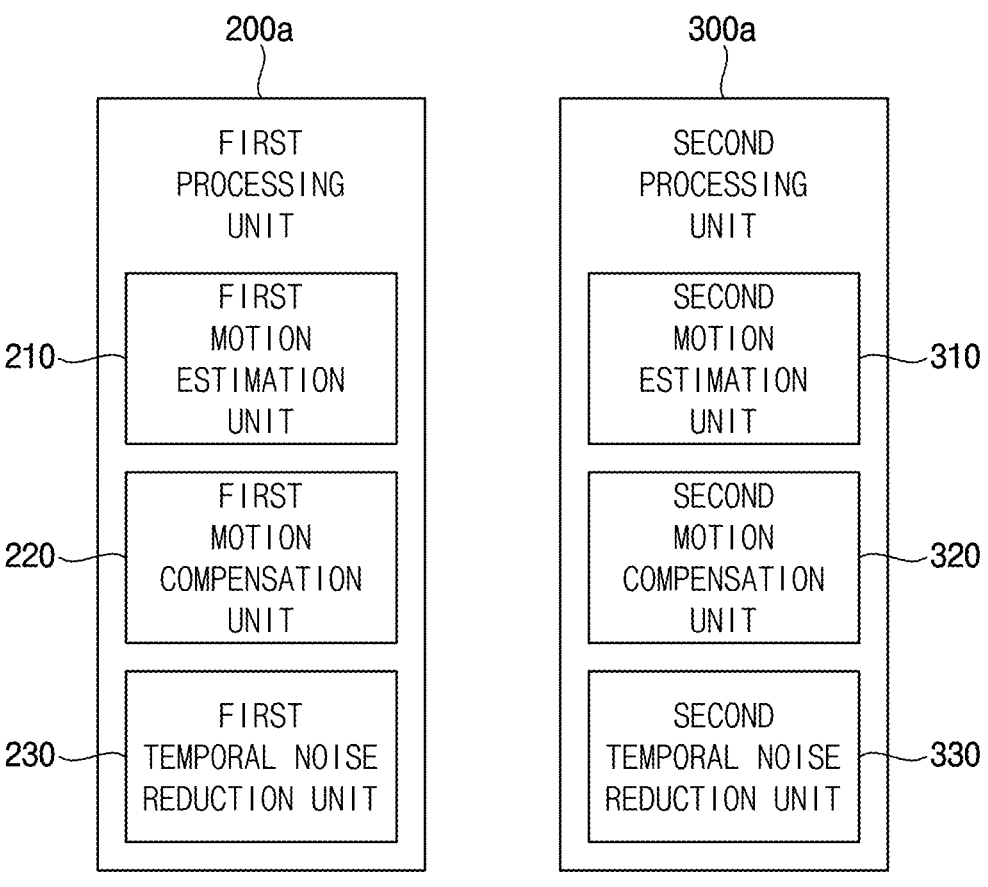
FIG. 13 is a block diagram illustrating an example of a first processing unit and a second processing unit included in an image processing device of FIG. 11 according to some example embodiments.

FIG. 13 is a block diagram illustrating an example of a first processing unit and a second processing unit included in an image processing device of FIG. 11 according to some example embodiments.

Referring to FIG. 13, in some example embodiments, a first processing unit 200a may include a first motion estimation unit 210, a first motion compensation unit 220 and a first temporal noise reduction unit 230. In some example embodiments, a second processing unit 300a may include a second motion estimation unit 310, a second motion compensation unit 320 and a second temporal noise reduction unit 330.

In some example embodiments, the first motion estimation unit 210 may perform the motion estimation operation $ME_{IIR}$ in FIG. 12 and operation S110 in FIG. 3. In some example embodiments, the first motion compensation unit 220 may perform the motion compensation operation $MC_{IIR}$ in FIG. 12 and operation S120 in FIG. 3. In some example embodiments, the first temporal noise reduction unit 230 may perform the temporal noise reduction operation $TNR_{IIR}$ in FIG. 12 and operation S130 in FIG. 3. In some example embodiments, the second motion estimation unit 310 may perform the motion estimation operation $ME_{FIR}$ in FIG. 12 and operation S210 in FIG. 4. In some example embodiments, the second motion compensation unit 320 may perform the motion compensation operation $MC_{FIR}$ in FIG. 12 and operation S220 in FIG. 4. In some example embodiments, the second temporal noise reduction unit 330 may perform the temporal noise reduction operation $TNR_{FIR}$ in FIG. 12 and operation S230 in FIG. 4.

In other words, FIG. 13 illustrates an example where components for performing the first processing operation P_IIR in FIG. 12 and operation S100 in FIG. 1 and components for performing the second processing operation P_FIR in FIG. 12 and operation S200 in FIG. 1 are separately/independently implemented according to some example embodiments. According to some example embodiments, at least part of the first processing operation P_IIR and the second processing operation P_FIR performed in one frame interval may be substantially simultaneously performed.

Figure 14A:
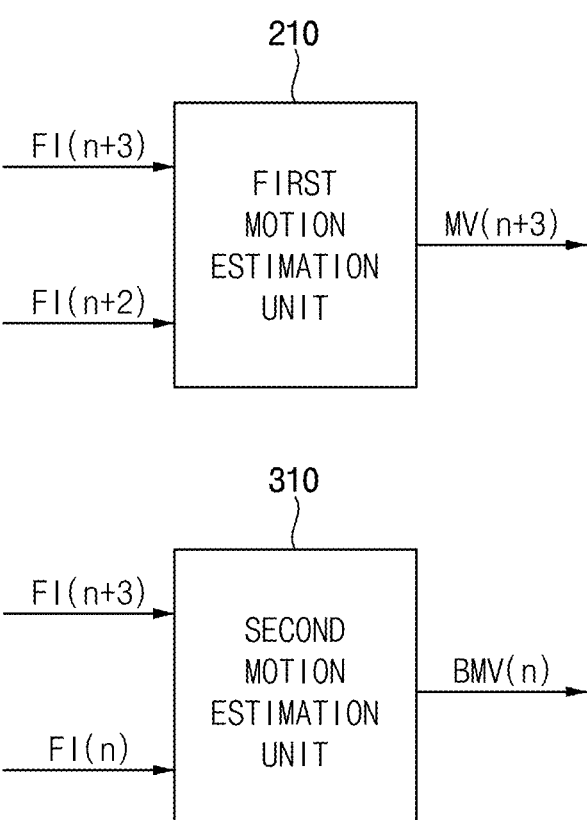
FIGS. 14A and 14B are block diagrams illustrating an example of motion estimation units, motion compensation units and temporal noise reduction units included in first and second processing units of FIG. 13 according to some example embodiments.
Figure 14B:
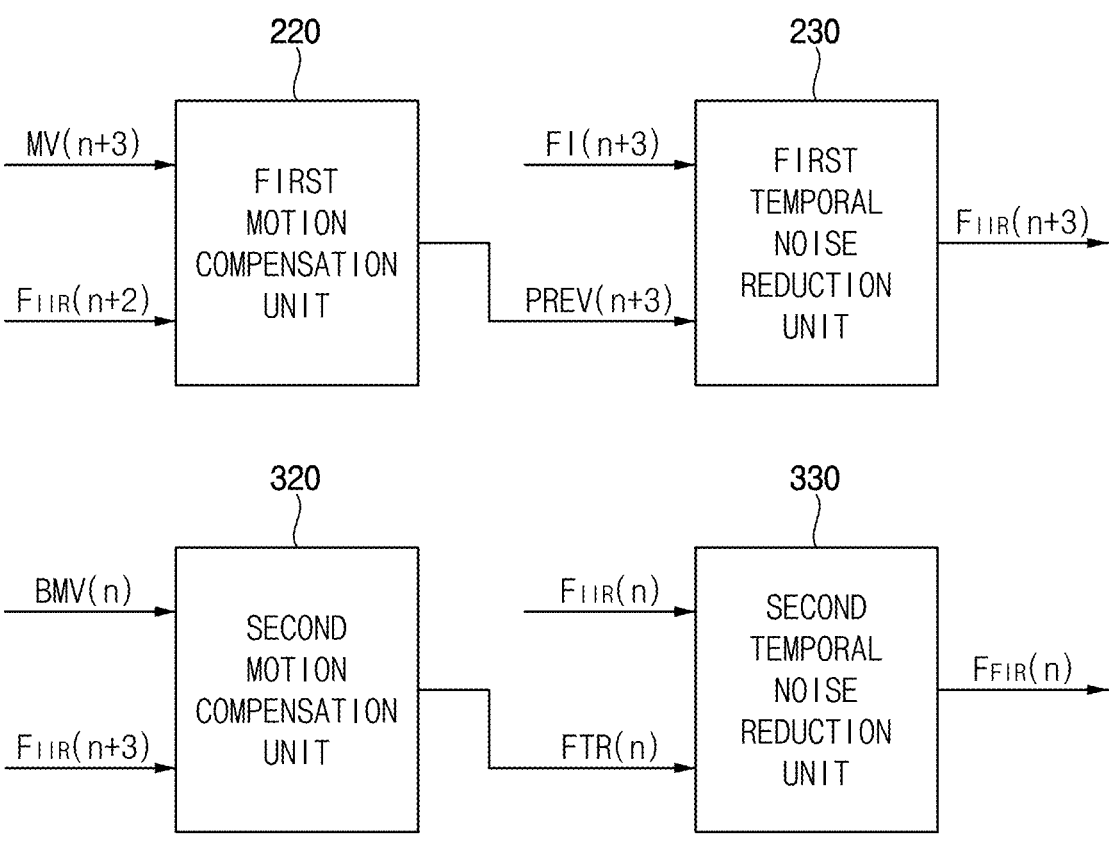

FIGS. 14A and 14B are block diagrams illustrating an example of motion estimation units, motion compensation units and temporal noise reduction units included in first and second processing units of FIG. 13 according to some example embodiments.

Referring to FIG. 14A, an operation of the first and second motion estimation units 210 and 310 in the (n+3)-th frame interval TF(n+3) of FIG. 12 is illustrated according to some example embodiments.

In some example embodiments, the first motion estimation unit 210 may perform the motion estimation operation $ME_{IIR}$ based on the (n+2)-th input frame image FI(n+2) and the (n+3)-th input frame image FI(n+3) to obtain the motion vector MV(n+3). In some example embodiments, the second motion estimation unit 310 may perform the motion estimation operation $ME_{FIR}$ based on the n-th input frame image FI(n) and the (n+3)-th input frame image FI(n+3) to obtain the backward motion vector BMV(n).

In some example embodiments, the operation of generating the motion vector MV(n+3) and the operation of generating the backward motion vector BMV(n) may be substantially simultaneously performed, but example embodiments are not limited thereto.

Referring to FIG. 14B, an operation of the first and second motion compensation units 220 and 320 and the first and second temporal noise reduction units 230 and 330 in the (n+3)-th frame interval TF(n+3) of FIG. 12 is illustrated according to some example embodiments.

In some example embodiments, the first motion compensation unit 220 may perform the motion compensation operation $MC_{IIR}$ based on the motion vector MV(n+3) and the composite frame image $F_{IIR}(n+2)$ to obtain the motion compensated frame image PREV(n+3). In some example embodiments, the first temporal noise reduction unit 230 may perform the temporal noise reduction operation $TNR_{IIR}$ based on the (n+3)-th input frame image FI(n+3) and the motion compensated frame image PREV(n+3) to obtain the composite frame image $F_{IIR}(n+3)$. In some example embodiments, the second motion compensation unit 320 may perform the motion compensation operation $MC_{FIR}$ based on the backward motion vector BMV(n) and the composite frame image FIR(n+3) to obtain the motion compensated frame image FTR(n). In some example embodiments, the second temporal noise reduction unit 330 may perform the temporal noise reduction operation $TNR_{FIR}$ based on the composite frame image $F_{IIR}(n)$ and the motion compensated frame image FTR(n) to obtain the composite frame image $F_{FIR}(n)$.

In some example embodiments, since the composite frame image $F_{FIR}(n)$ is generated using the composite frame image $F_{IIR}(n+3)$, the operation of generating the composite frame image FIR(n+3) may be performed first, and then the operation of generating the composite frame image $F_{FIR}(n)$ may be performed later.

Figure 15:
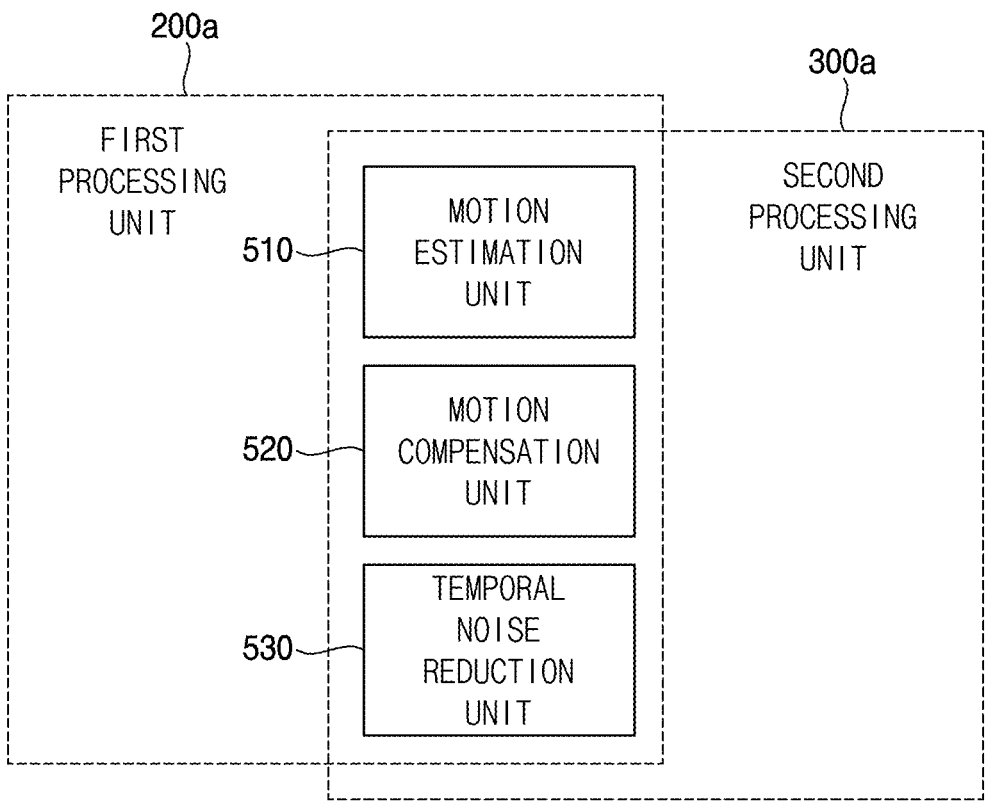
FIG. 15 is a block diagram illustrating an example of a first processing unit and a second processing unit included in an image processing device of FIG. 11 according to some example embodiments.

FIG. 15 is a block diagram illustrating an example of a first processing unit and a second processing unit included in an image processing device of FIG. 11 according to some example embodiments.

Referring to FIG. 15, in some example embodiments, a first processing unit 200a and a second processing unit 300a may include a motion estimation unit 510, a motion compensation unit 520 and a temporal noise reduction unit 530. In other words, the motion estimation unit 510, the motion compensation unit 520 and the temporal noise reduction unit 530 may be shared by the first processing unit 200a and the second processing unit 300a, but example embodiments are not limited thereto.

In some example embodiments, the motion estimation unit 510 may perform the motion estimation operation $ME_{IIR}$ and the motion estimation operation $ME_{FIR}$ in FIG. 12, and may perform operation S110 in FIG. 3 and operation S210 in FIG. 4. In some example embodiments, the motion compensation unit 520 may perform the motion compensation operation $MC_{IIR}$ and the motion compensation operation $MC_{FIR}$ in FIG. 12, and may perform operation S120 in FIG. 3 and operation S220 in FIG. 4. In some example embodiments, the temporal noise reduction unit 530 may perform the temporal noise reduction operation $TNR_{IIR}$ and the temporal noise reduction operation $TNR_{FIR}$ in FIG. 12, and may perform operation S130 in FIG. 3 and operation S230 in FIG. 4.

In other words, FIG. 15 illustrates an example where components for performing the first processing operation P_IIR in FIG. 12 and operation S100 in FIG. 1 and components for performing the second processing operation P_FIR in FIG. 12 and operation S200 in FIG. 1 are implemented in an integrated manner according to some example embodiments. In this example, the first processing operation P_IIR and the second processing operation P_FIR performed in one frame interval may be sequentially performed, but example embodiments are not limited thereto.

Figure 16A:
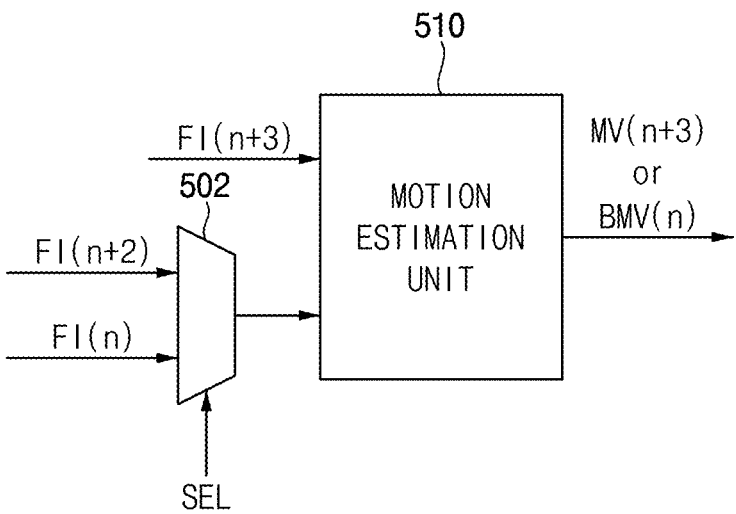
Figure 16B:
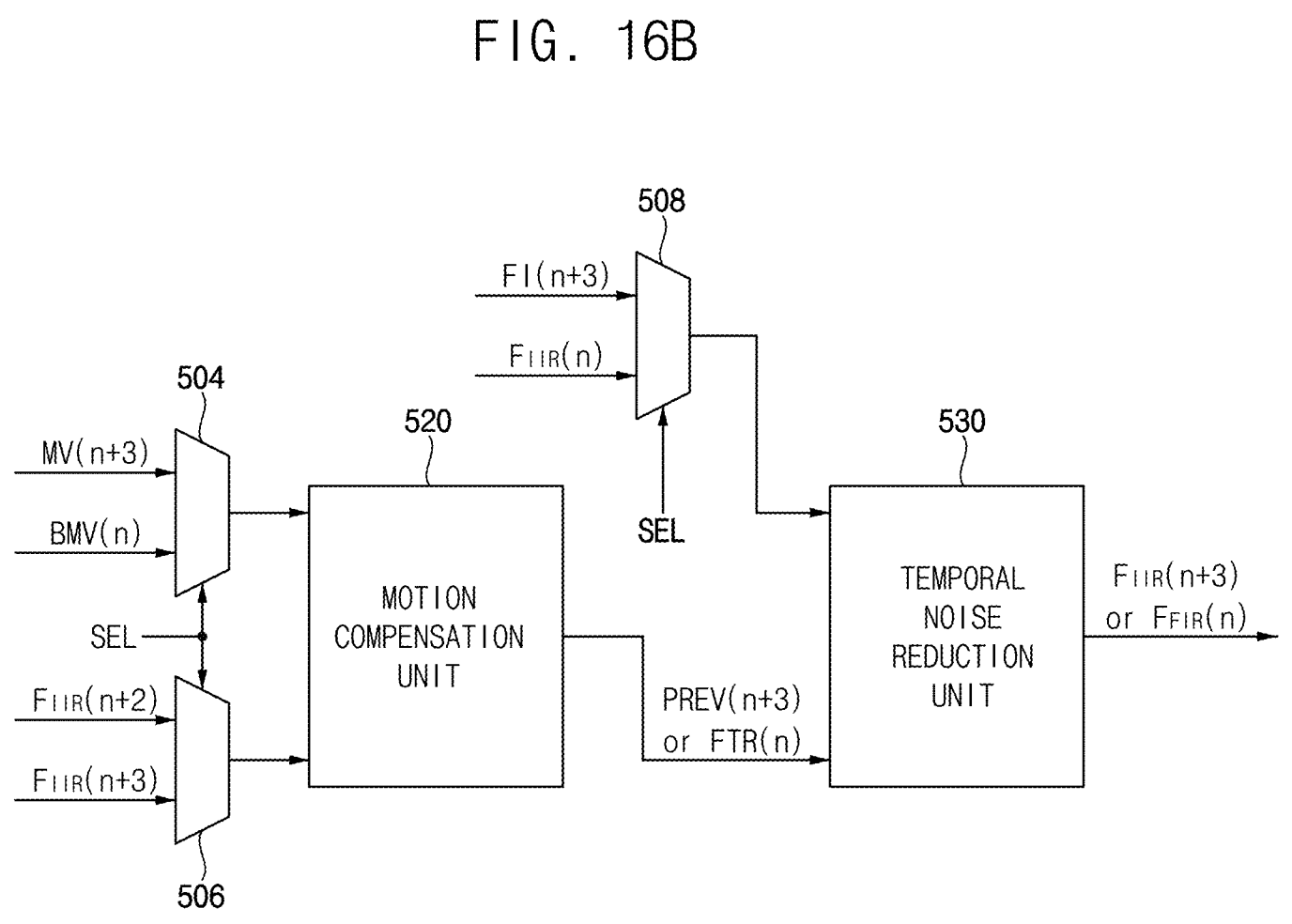

FIGS. 16A and 16B are block diagrams illustrating an example of a motion estimation unit, a motion compensation unit and a temporal noise reduction unit included in first and second processing units of FIG. 15 according to some example embodiments.

Referring to FIG. 16A, in some example embodiments, an operation of the motion estimation unit 510 in the (n+3)-th frame interval TF(n+3) of FIG. 12 is illustrated. For example, the image processing device including the motion estimation unit 510 may further include a multiplexer 502 connected to the motion estimation unit 510. For example, the multiplexer 502 may output one of the (n+2)-th input frame image FI(n+2) and the n-th input frame image FI(n) based on a selection signal SEL.

In some example embodiments, the motion estimation unit 510 may perform the motion estimation operation $ME_{IIR}$ based on the (n+2)-th input frame image FI(n+2) and the (n+3)-th input frame image FI(n+3) to obtain the motion vector MV(n+3), and may perform the motion estimation operation $ME_{FIR}$ based on the n-th input frame image FI(n) and the (n+3)-th input frame image FI(n+3) to obtain the backward motion vector BMV(n).

In some example embodiments, since the operation of generating the composite frame image $F_{IIR}$(n+3) is performed first and then the operation of generating the composite frame image $F_{FIR}$(n) is performed later, the operation of generating the motion vector MV(n+3) used to generate the composite frame image FIR(n+3) may be performed first, and then the operation of generating the backward motion vector BMV(n) used to generate the composite frame image $F_{FIR}$(n) may be performed later, but example embodiments are not limited thereto.

Referring to FIG. 16B, an operation of the motion compensation unit 520 and the temporal noise reduction unit 530 in the (n+3)-th frame interval TF(n+3) of FIG. 12 is illustrated according to some example embodiments. For example, the image processing device including the motion compensation unit 520 and the temporal noise reduction unit 530 may further include multiplexers 504 and 506 connected to the motion compensation unit 520 and a multiplexer 508 connected to the temporal noise reduction unit 530. For example, the multiplexer 504 may output one of the motion vector MV(n+3) and the backward motion vector BMV(n) based on the selection signal SEL. For example, the multiplexer 506 may output one of the composite frame image $F_{IIR}$(n+2) and the composite frame image $F_{IIR}$(n+3) based on the selection signal SEL. For example, the multiplexer 508 may output one of the (n+3)-th input frame image FI(n+3) and the composite frame image $F_{IIR}$(n) based on the selection signal SEL.

According to some example embodiments, the motion compensation unit 520 may perform the motion compensation operation $MC_{IIR}$ based on the motion vector MV(n+3) and the composite frame image $F_{IIR}$(n+2) to obtain the motion compensated frame image PREV(n+3), and may perform the motion compensation operation $MC_{FIR}$ based on the backward motion vector BMV(n) and the composite frame image $F_{IIR}$(n+3) to obtain the motion compensated frame image FTR(n). The temporal noise reduction unit 530 may perform the temporal noise reduction operation $TNR_{IIR}$ based on the (n+3)-th input frame image FI(n+3) and the motion compensated frame image PREV(n+3) to obtain the composite frame image $F_{IIR}$(n+3), and may perform the temporal noise reduction operation $TNR_{FIR}$ based on the composite frame image FIR(n) and the motion compensated frame image FTR(n) to obtain the composite frame image $F_{FIR}$(n).

In some example embodiments, since the composite frame image $F_{FIR}$(n) is generated using the composite frame image $F_{IIR}$(n+3), the operation of generating the composite frame image $F_{IIR}$(n+3) may be performed first, and then the operation of generating the composite frame image $F_{FIR}$(n) may be performed later.

In some example embodiments, to implement the example of FIGS. 14A and 14B, existing hardware may be changed to dedicated hardware. In some example embodiments, to implement the example of FIGS. 16A and 16B, a time sharing scheme may be applied while using existing hardware.

Although FIGS. 13, 14A and 14B illustrate a first configuration including two motion estimation units, two motion compensation units and two temporal noise reduction units, and although FIGS. 15, 16A and 16B illustrate a second configuration including one motion estimation unit, one motion compensation unit and one temporal noise reduction unit, example embodiments are not limited thereto, and some example embodiments may be implemented by combining the first configuration and the second configuration. For example, some example embodiments may be implemented with two motion compensation units 210 and 310 in FIG. 14A, one motion compensation unit 520 and one temporal noise reduction unit 530 in FIG. 16B. For example, some example embodiments may be implemented with one motion estimation unit 510 in FIG. 16A, two motion compensation units 220 and 320 and two temporal noise reduction units 230 and 330 in FIG. 14B.

Figure 17:
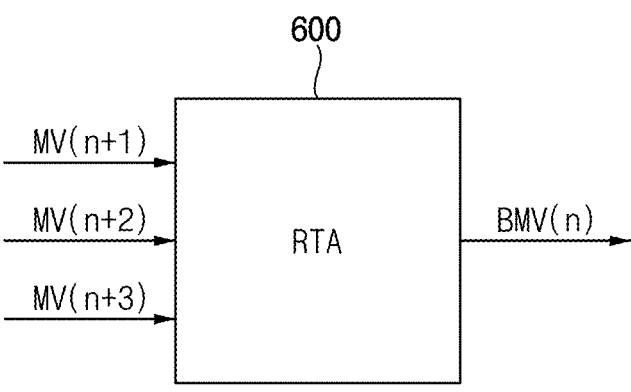
FIG. 17 is a block diagram illustrating an example of a motion estimation unit included in a second processing unit of FIGS. 13 and 15 according to some example embodiments.

FIG. 17 is a block diagram illustrating an example of a motion estimation unit included in a second processing unit of FIGS. 13 and 15 according to some example embodiments.

Referring to FIG. 17, in some example embodiments, a motion estimation unit may include a real-time application (RTA) 600.

In some example embodiments, the backward motion vector BMV(n) may be calculated using the motion vectors MV(n+1), MV(n+2) and MV(n+3) that are previously generated, rather than directly performing the motion estimation operation $ME_{FIR}$ to generate the backward motion vector BMV(n). For example, the motion vectors MV(n+1), MV(n+2) and MV(n+3) may be accumulated, and an inverse value of the accumulated value may be calculated to obtain the backward motion vector BMV(n). In other words, the backward motion vector BMV(n) using motion vectors from MV(n+1) to MV(n+k) may be obtained based on Equation 1.

$$BMV(n) = INV(MV(n+1) \circ \ldots \circ MV(n+k)) \quad \text{[Equation 1]}$$

As compared to an example where the motion estimation operation $ME_{FIR}$ is directly performed, the accuracy of motion estimation may be reduced when Equation 1 is used, but the hardware area and power consumption may be reduced when Equation 1 is used. For example, it may be implemented using a local motion estimation (LME) RTA.

Figure 18:
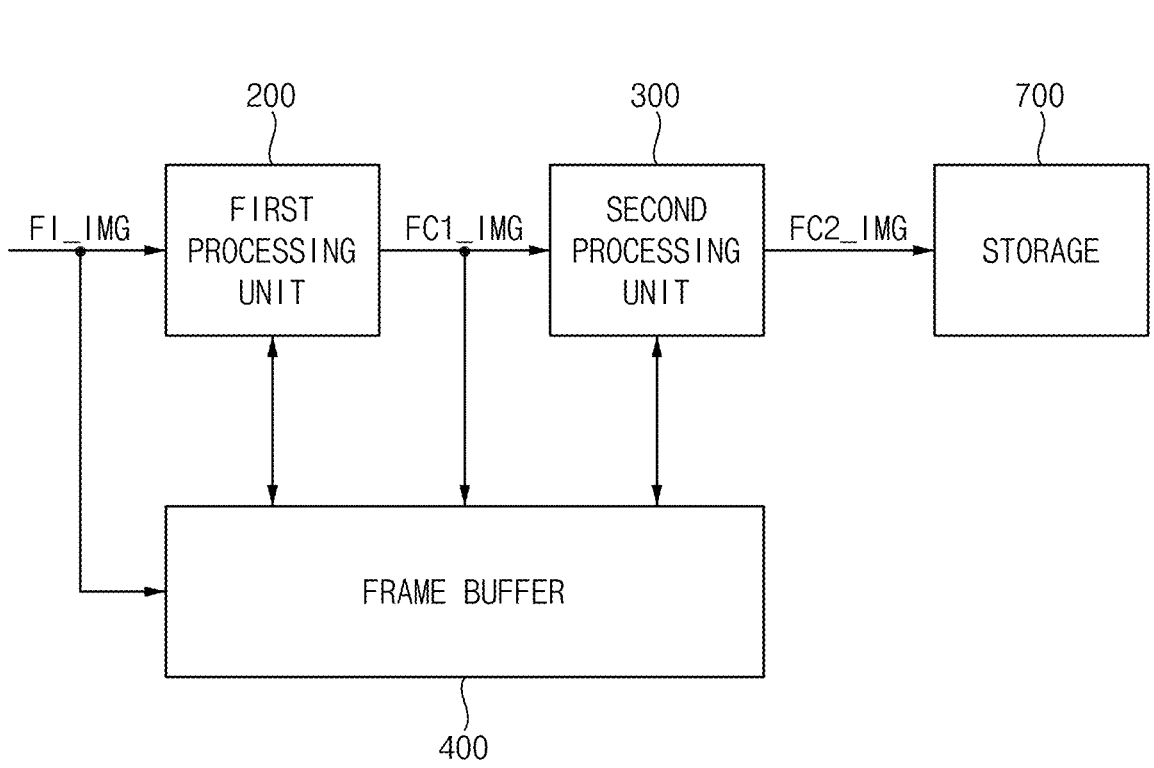
FIG. 18 is a block diagram illustrating an image processing device according to some example embodiments.

FIG. 18 is a block diagram illustrating an image processing device according to some example embodiments. The descriptions repeated with FIG. 11 will be omitted.

Referring to FIG. 18, in some example embodiments, an image processing device 100*a* includes a first processing unit 200 and a second processing unit 300. The image processing device 100*a* may further include a frame buffer 400 and a storage 700, but example embodiments are not limited thereto.

In some example embodiments, the image processing device 100*a* may be substantially the same as the image processing device 100 of FIG. 11, except that the image processing device 100*a* further includes the storage 700.

In some example embodiments, the storage 700 may store the plurality of composite frame images FC2_IMG, e.g., the plurality of output frame images. For example, the storage 700 may include at least one nonvolatile memory. In some example embodiments, the storage 700 may be a solid state drive (SSD), a universal flash storage (UFS), a multi-media card (MMC) or an embedded multi-media card (eMMC). In other example embodiments, the storage 700 may be one of a secure digital (SD) card, a micro SD card, a memory stick, a chip card, a universal serial bus (USB) card, a smart card, a compact flash (CF) card, or the like. In some example embodiments, the storage 700 may be located outside the image processing device 100*a*.

Figure 19:
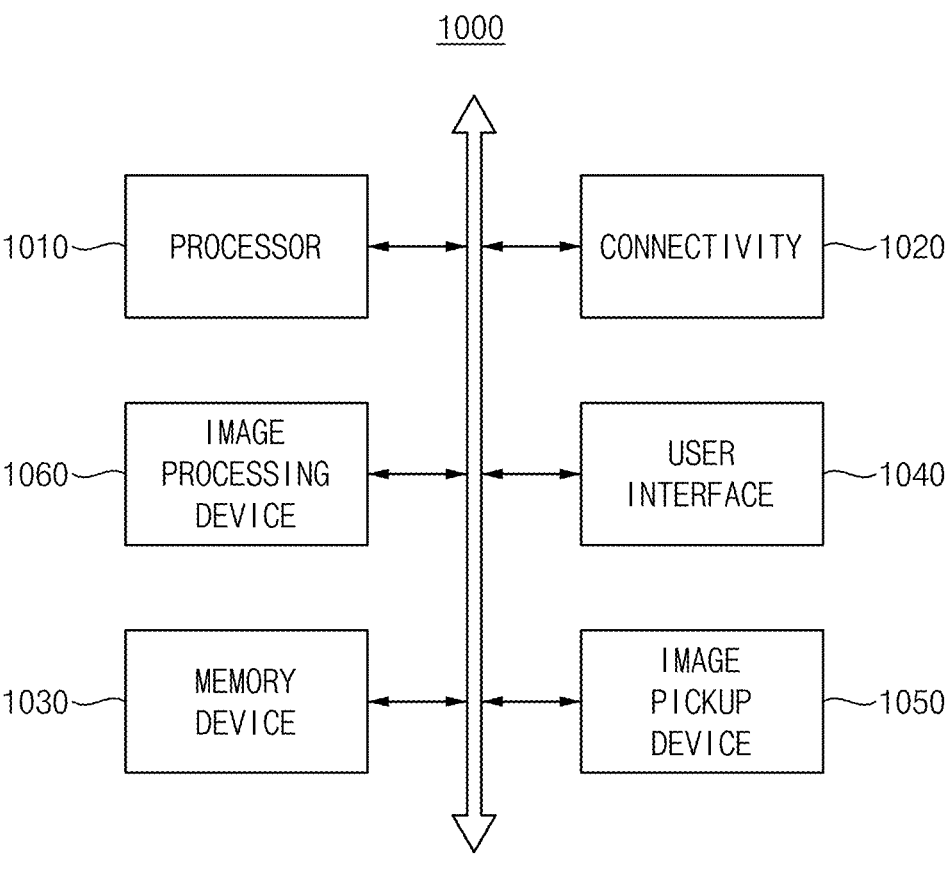
FIG. 19 is a block diagram illustrating an electronic system according to some example embodiments.

FIG. 19 is a block diagram illustrating an electronic system according to some example embodiments.

Referring to FIG. 19, in some example embodiments, an electronic system 1000 includes a processor 1010, a connectivity 1020, a memory device 1030, a user interface 1040, an image pickup device 1050 and an image processing device 1060. Although not illustrated in FIG. 19, the electronic system 1000 may further include a power supply.

The processor 1010 may perform various computational functions such as particular calculations and tasks. The connectivity 1020 may communicate with an external device. The memory device 1030 may operate as a data storage for data processed by the processor 1010 or a working memory. The user interface 1040 may include at least one input device such as a keypad, a button, a microphone, a touch screen, etc., and/or at least one output device such as a speaker, or a display device, etc., but example embodiments are not limited thereto. The power supply may provide power to the electronic system 1000.

In some example embodiments, the image pickup device 1050 and the image processing device 1060 are controlled by the processor 1010. The image pickup device 1050 generates a plurality of frame images. For example, the image pickup device 1050 may include a complementary metal oxide semiconductor (CMOS) image sensor, a charged coupled device (CCD) image sensor, or the like, but example embodiments are not limited thereto. In some example embodiments, the plurality of frame images may be directly provided to the image processing device 1060, or may be stored in the memory device 1030 and provided to the image processing device 1060. The image processing device 1060 may be the image processing device according to some example embodiments described with reference to FIGS. 11 through 18, and may perform the method of processing the image according to some example embodiments described with reference to FIGS. 1 through 10. In some example embodiments, the image processing device 1060 may be included in the processor 1010.

Example embodiments may be applied to various electronic devices and systems that include the image processing devices and systems. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. While the inventive concepts have been shown and described with reference to some example embodiments thereof, it will be understood that various changes in form and details may be made therein without departing from the spirit and scope of the following claims.

What is claimed is:

1. A method of processing an image, the method comprising:

generating a first composite frame image corresponding to an n-th input frame image by performing a first temporal noise reduction operation based on the n-th input frame image and an (n−m)-th input frame image, where n is a natural number greater than or equal to two and m is a natural number smaller than n, the n-th input frame image and the (n−m)-th input frame image being included in a plurality of input frame images, the (n−m)-th input frame image being received prior to the n-th input frame image;

generating a second composite frame image corresponding to the n-th input frame image by performing a second temporal noise reduction operation based on the first composite frame image corresponding to the n-th input frame image and an (n+k)-th input frame image, where k is a natural number, the (n+k)-th input frame image being included in the plurality of input frame images and received subsequent to the n-th input frame image; and providing the second composite frame image as an n-th output frame image corresponding to the n-th input frame image.

2. The method of claim 1, wherein generating the first composite frame image includes:

obtaining an n-th motion vector associated with the n-th input frame image based on the n-th input frame image and the (n−m)-th input frame image;

obtaining a first motion compensated frame image based on the n-th motion vector and a third composite frame image corresponding to the (n−m)-th input frame image; and obtaining the first composite frame image to which the first temporal noise reduction operation is applied, based on the n-th input frame image and the first motion compensated frame image.

3. The method of claim 2, wherein the first temporal noise reduction operation is an operation based on an infinite impulse response filtering.

4. The method of claim 3, wherein the third composite frame image is a frame image to which the infinite impulse response filtering is applied to the (n−m)-th input frame image.

5. The method of claim 2, wherein the (n−m)-th input frame image is an (n−1)-th input frame image that is received immediately before the n-th input frame image among the plurality of input frame images.

6. The method of claim 2, wherein obtaining the n-th motion vector includes:

extracting a global movement between the n-th input frame image and the (n−m)-th input frame image; and obtaining a global motion vector corresponding to the global movement as the n-th motion vector.

7. The method of claim 2, wherein obtaining the n-th motion vector includes:

extracting a local movement for a first object between the n-th input frame image and the (n−m)-th input frame image, the first object being one of a plurality of objects included in both the n-th input frame image and the (n−m)-th input frame image; and obtaining a local motion vector corresponding to the local movement as the n-th motion vector.

8. The method of claim 2, wherein generating the second composite frame image includes:

obtaining an n-th backward motion vector associated with the n-th input frame image based on the n-th input frame image and the (n+k)-th input frame image;

obtaining a second motion compensated frame image based on the n-th backward motion vector and a fourth composite frame image corresponding to the (n+k)-th input frame image; and obtaining the second composite frame image to which the second temporal noise reduction operation is applied, based on the n-th input frame image and the second motion compensated frame image.

9. The method of claim 8, wherein the second temporal noise reduction operation is an operation based on a finite impulse response filtering.

10. The method of claim 9, wherein the fourth composite frame image is a frame image to which an infinite impulse response filtering is applied to the (n+k)-th input frame image.

11. The method of claim 8, wherein the (n+k)-th input frame image is an (n+3)-th input frame image that is received after the n-th input frame image among the plurality of input frame images.

12. The method of claim 1, further comprising:

storing the n-th output frame image.

13. An image processing device comprising:

a first processing circuitry configured to generate a first composite frame image corresponding to an n-th input frame by performing a first temporal noise reduction operation based on the n-th input frame image and an (n−m)-th input frame image, where n is a natural number greater than or equal to two and m is a natural number smaller than n, the n-th input frame image and the (n−m)-th input frame image being included in a plurality of input frame images, the (n−m)-th input frame image being received prior to the n-th input frame image; and a second processing circuitry configured to generate a second composite frame image corresponding to the n-th input frame image by performing a second temporal noise reduction operation based on the first composite frame image corresponding to the n-th input frame image and an (n+k)-th input frame image, where k is a natural number, and to provide the second composite frame image as an n-th output frame image corresponding to the n-th input frame image, the (n+k)-th input frame image being included in the plurality of input frame images and received subsequent to the n-th input frame image.

14. The image processing device of claim 13, wherein the first processing circuitry is configured to obtain an n-th motion vector associated with the n-th input frame image based on the n-th input frame image and the (n−m)-th input frame image.

15. The image processing device of claim 14, wherein the second processing circuitry is configured to obtain an n-th backward motion vector associated with the n-th input frame image based on the n-th input frame image and the (n+k)-th input frame image.

16. The image processing device of claim 13, wherein the first processing circuitry or the second processing circuitry is configured to obtain an n-th motion vector associated with the n-th input frame image based on the n-th input frame image and the (n−m)-th input frame image, and to obtain an n-th backward motion vector associated with the n-th input frame image based on the n-th input frame image and the (n+k)-th input frame image.

17. The image processing device of claim 13, wherein the first processing circuitry is configured to obtain a first motion compensated frame image based on an n-th motion vector associated with the n-th input frame image and a third composite frame image corresponding to the (n−m)-th input frame image; and obtain the first composite frame image to which the first temporal noise reduction operation is applied, based on the n-th input frame image and the first motion compensated frame image.

18. The image processing device of claim 17, wherein the second processing circuitry is configured to obtain a second motion compensated frame image based on an n-th backward motion vector associated with the n-th input frame image and a fourth composite frame image corresponding to the (n+k)-th input frame image; and obtain the second composite frame image to which the second temporal noise reduction operation is applied, based on the n-th input frame image and the second motion compensated frame image.

19. The image processing device of claim 13, wherein the first processing circuitry or the second processing circuitry is configured to obtain a first motion compensated frame image based on an n-th motion vector associated with the n-th input frame image and a third composite frame image corresponding to the (n−m)-th input frame image, and to obtain a second motion compensated frame image based on an n-th backward motion vector associated with the n-th input frame image and a fourth composite frame image corresponding to the (n+k)-th input frame image; and obtain the first composite frame image to which the first temporal noise reduction operation is applied, based on the n-th input frame image and the first motion compensated frame image, and to obtain the second composite frame image to which the second temporal noise reduction operation is applied, based on the n-th input frame image and the second motion compensated frame image.

20. A method of processing an image, the method comprising:

obtaining a present motion vector associated with a present input frame image based on the present input frame image and a past input frame image, the past input frame image being received prior to the present input frame image;

obtaining a first motion compensated frame image based on the present motion vector and a first composite frame image, the first composite frame image being a frame image to which an infinite impulse response filtering is applied to the past input frame image;

obtaining a second composite frame image based on the present input frame image and the first motion compensated frame image, the second composite frame image being a frame image to which a first temporal noise reduction operation based on the infinite impulse response filtering is applied to the present input frame image;

obtaining a present backward motion vector associated with the present input frame image based on the present input frame image and a future input frame image, the future input frame image being received subsequent to the present input frame image;

obtaining a second motion compensated frame image based on the present backward motion vector and a third composite frame image, the third composite frame image being a frame image to which the infinite impulse response filtering is applied to the future input frame image;

obtaining a fourth composite frame image based on the present input frame image and the second motion compensated frame image, the fourth composite frame image being a frame image to which a second temporal noise reduction operation based on a finite impulse response filtering is applied to the present input frame image; and providing and storing the fourth composite frame image as a present output frame image corresponding to the present input frame image, wherein the present input frame image is an n-th input frame image among a plurality of input frame images, where n is a natural number greater than or equal to two, wherein the past input frame image is an (n−1)-th input frame image that is received immediately before the n-th input frame image among the plurality of input frame images, and wherein the future input frame image is an (n+k)-th input frame image that is received after the n-th input frame image among the plurality of input frame images.

* * * * *